(12) United States Patent
Choi et al.

(10) Patent No.: US 11,880,529 B2
(45) Date of Patent: Jan. 23, 2024

(54) DISPLAY DEVICE

(71) Applicant: Samsung Display Co., Ltd., Yongin-si (KR)

(72) Inventors: Jaeuk Choi, Seoul (KR); Yun-Ho Kim, Hwaseong-si (KR); Chul Kim, Hwaseong-si (KR); Bonghyun You, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/349,796

(22) Filed: Jun. 16, 2021

(65) Prior Publication Data

US 2021/0405847 A1 Dec. 30, 2021

(30) Foreign Application Priority Data

Jun. 30, 2020 (KR) ........................ 10-2020-0080263

(51) Int. Cl.
*G06F 3/041* (2006.01)
*G06F 3/044* (2006.01)
(Continued)

(52) U.S. Cl.
CPC ........ *G06F 3/04166* (2019.05); *G06F 3/0443* (2019.05); *G06F 3/0446* (2019.05);
(Continued)

(58) Field of Classification Search
CPC ............. G06F 3/04166; G06F 3/04162; G06F 3/0443; G06F 3/0446; G06F 3/03545; G06F 3/0412; G06F 3/04164; G06F 2203/04102; G06F 2203/04101; G06F 2203/04111; G06F 2203/04112; G09G 3/3266;
(Continued)

(56) References Cited

U.S. PATENT DOCUMENTS 10,496,205 B2  12/2019  Jung et al.
10,606,389 B2   3/2020  Ju et al.
(Continued)

FOREIGN PATENT DOCUMENTS

KR  10-2018-0068383 A  6/2018
KR  10-2018-0077375 A  7/2018
(Continued)

*Primary Examiner* — David Tung
(74) *Attorney, Agent, or Firm* — Lewis Roca Rothgerber Christie LLP

(57) ABSTRACT

An display device, includes: an input sensor including: a sensor controller configured to operate in a first mode, in which the first electrode and the second electrode are operated as different groups, or in a second mode, in which the first electrode and the second electrode are operated as a same group, wherein the sensor controller is configured to have an operation time of the first mode, which is longer than an operation time of the second mode, in response to the input sensor operating in the first driving mode during successive sensing periods of a first group, and the sensor controller is configured to have the operation time of the second mode, which is longer than the operation time of the first mode, in response to the input sensor operating in the second driving mode during successive sensing periods of a second group.

18 Claims, 19 Drawing Sheets

(51) Int. Cl.
   *G09G 3/3266* (2016.01)
   *G09G 3/00* (2006.01)
   *G06F 3/0354* (2013.01)
   *G09G 3/3275* (2016.01)

(52) U.S. Cl.
   CPC ....... *G06F 3/04162* (2019.05); *G09G 3/3266* (2013.01); *G06F 3/03545* (2013.01); *G06F 2203/04102* (2013.01); *G09G 3/035* (2020.08); *G09G 3/3275* (2013.01); *G09G 2310/0202* (2013.01); *G09G 2310/08* (2013.01)

(58) Field of Classification Search
   CPC .... G09G 3/035; G09G 3/3275; G09G 3/3208; G09G 2310/0202; G09G 2310/08; G09G 2310/0278; H01L 27/3225; H01L 27/3276
   See application file for complete search history.

(56) References Cited

U.S. PATENT DOCUMENTS

| | | | |
|---|---|---|---|
| 10,691,228 B2 | 6/2020 | Bae et al. | |
| 2014/0240280 A1* | 8/2014 | Ekici | G06F 3/041662 345/174 |
| 2017/0017336 A1* | 1/2017 | Mayumi | G06F 3/0446 |
| 2020/0004367 A1* | 1/2020 | Lee | G06F 3/03545 |
| 2021/0397326 A1 | 12/2021 | Kim et al. | |

FOREIGN PATENT DOCUMENTS

| | | | |
|---|---|---|---|
| KR | 10-2020-0001889 A | 1/2020 |
| KR | 10-2020-0025573 A | 3/2020 |
| KR | 10-2021-0156916 A | 12/2021 |

\* cited by examiner

DISPLAY DEVICE

CROSS-REFERENCE TO RELATED APPLICATIONS

The present application claims priority to and the benefit of Korean Patent Application No. 10-2020-0080263, filed on Jun. 30, 2020, in the Korean Intellectual Property Office, the entire content of which is hereby incorporated by reference.

BACKGROUND

A display device may be configured to sense an external input. An example of the external input is an input provided from a user. The user's input may include various sources of external input, such as a touch or proximity input from a portion of the user's body, a pen, light, heat, or pressure. The display device may be configured to obtain information on coordinates of a pen in an electromagnetic resonance (EMR) or active electrostatic (AES) manner.

The above information disclosed in this Background section is only for enhancement of understanding of the background and therefore the information discussed in this Background section does not necessarily constitute prior art.

SUMMARY

Aspects of some example embodiments of the present disclosure relate to a display device capable of sensing an input from a passive-type input device and an input from an active-type input device.

Aspects of some example embodiments of the inventive concept include a display device with relatively improved input sensing properties and capabilities.

According to some example embodiments of the inventive concept, a display device may include a display panel generating an image and an input sensor operating in a first driving mode or a second driving mode. The input sensor may include a sensor layer including a first electrode and a second electrode crossing each other, and a sensor controller operating in a first mode, in which the first electrode and the second electrode are operated as different groups, or in a second mode, in which the first electrode and the second electrode are operated as the same group. An operation time of the sensor controller may be longer in the first mode than in the second mode, when the input sensor is operated in the first driving mode during successive sensing periods of a first group. The operation of the sensor controller may be longer in the second mode than in the first mode, when the input sensor is operated in the second driving mode during successive sensing periods of a second group.

According to some example embodiments, each of the successive sensing periods of the first group may include a plurality of first mode periods, in which the sensor controller may be operated in the first mode.

According to some example embodiments, during the successive sensing periods of the first group, an operation of the input sensor may be repeated by units of i sensing periods, where i may be a natural number that may be equal to or larger than 2, and at least one sensing period of the i sensing periods may include a second mode period, in which the sensor controller may be operated in the second mode.

According to some example embodiments, each of the remaining sensing periods of the i sensing periods include the first mode periods, the number of which may be m that may be a natural number equal to or larger than 2, and the at least one sensing period may further include the first mode periods, the number of which may be smaller than the number m.

According to some example embodiments, the first mode period of the at least one sensing period may be longer than the first mode period of each of the remaining sensing periods.

According to some example embodiments, each of the remaining sensing periods of the i sensing periods include the first mode periods, the number of which may be m that may be a natural number equal to or larger than 2, the at least one sensing period may include the first mode periods, the number of which may be m, and the first mode period of the at least one sensing period may be shorter than the first mode period of each of the remaining sensing periods.

According to some example embodiments, each of the i sensing periods may include the second mode period.

According to some example embodiments, the i sensing periods include front-end sensing periods and back-end sensing periods occurring in an alternating manner, the second mode period of each of the back-end sensing periods may be positioned in front of the plurality of first mode periods of each of the front-end sensing periods, when the second mode period of each of the front-end sensing periods may be positioned behind the plurality of first mode periods of each of the front-end sensing periods, and the second mode period of each of the back-end sensing periods may be positioned behind the plurality of first mode periods of each of the front-end sensing periods, when the second mode period of each of the front-end sensing periods may be positioned in front of the plurality of first mode periods of each of the front-end sensing periods.

According to some example embodiments, the operation of the input sensor may be changed from the first driving mode to the second driving mode, when an input may be sensed during the second mode period.

According to some example embodiments, during each of the plurality of first mode periods, the sensor controller provides a driving signal of a first mode to one of the first and second electrodes and receives a sensing signal from the other of the first and second electrodes.

According to some example embodiments, each of the successive sensing periods of the second group may include a plurality of second mode periods, in which the sensor controller may be operated in the second mode.

According to some example embodiments, each of the plurality of second mode periods may include an up-link period, in which the first and second electrodes receive an up-link signal from the sensor controller, and a down-link period, in which the first and second electrodes receive a down-link signal from an input device.

According to some example embodiments, the down-link signal may include a driving signal of a second mode indicating an input of the input device and a modulation signal indicating information of the input device, and the down-link period may include a first period, in which the first and second electrodes receive the driving signal of the second mode, and a second period, in which the first and second electrodes receive the modulation signal.

According to some example embodiments, during the successive sensing periods of the second group, an operation of the input sensor may be repeated by units of k sensing periods, where k may be a natural number that may be equal to or larger than 2, at least one sensing period of the k sensing periods may include a first mode period, in which the sensor controller may be operated in the first mode, remaining sensing periods of the k sensing periods include the second mode periods, the number of which may be p that may be a natural number equal to or larger than 2, the at least one sensing period include the second mode periods, the number of which may be the number p, and the second mode period of the at least one sensing period may be shorter than the second mode period of the remaining sensing periods.

According to some example embodiments, the operation of the input sensor may be changed from the second driving mode to the first driving mode, when an input may be sensed during the first mode period.

According to some example embodiments, each of the successive sensing periods of the second group may further include a first mode period, in which the sensor controller may be operated in the first mode.

According to some example embodiments, the operation of the input sensor may be changed from the second driving mode to the first driving mode, when an input may be not sensed during a specific period of the successive sensing periods of the second group.

According to some example embodiments, the display panel may include a display layer including a plurality of scan lines, a plurality of data lines, and a plurality of pixels connected to the plurality of scan lines and the plurality of data lines, a scan driving circuit connected to the plurality of scan lines, and a data driving circuit connected to the plurality of data lines. The scan driving circuit provides scan signals to the plurality of scan lines, respectively, during each of a plurality of frame periods, in synchronization with vertical synchronization signal.

According to some example embodiments, each of the successive sensing periods of the first group may be synchronized with a corresponding one of the plurality of frame periods. Each of the successive sensing periods of the second group may be synchronized with a corresponding one of the plurality of frame periods.

According to some example embodiments of the inventive concept, a display device may include a display panel generating a frame image during each of frame periods and an input sensor operating in a first driving mode or a second driving mode. The input sensor may include a sensor layer including a first electrode and a second electrode, which are electrically disconnected from each other and cross each other, and a sensor controller electrically connected to the sensor layer. The sensor controller may be operated in a first mode of providing a driving signal to the first electrode and receiving a sensing signal from the second electrode, or in a second mode of providing an up-link signal to the first and second electrodes and receiving a down-link signal from an active pen through the first and second electrodes. An operation time of the sensor controller may be longer in the first mode than in the second mode, when the input sensor is operated in the first driving mode during some successive periods of the frame periods. The operation time of the sensor controller may be longer in the second mode than in the first mode, when the input sensor is operated in the second driving mode during other successive periods of the frame periods.

BRIEF DESCRIPTION OF THE DRAWINGS

Aspects of some example embodiments will be more clearly understood from the following brief description taken in conjunction with the accompanying drawings. The accompanying drawings represent non-limiting, example embodiments as described herein.

Figure 1:
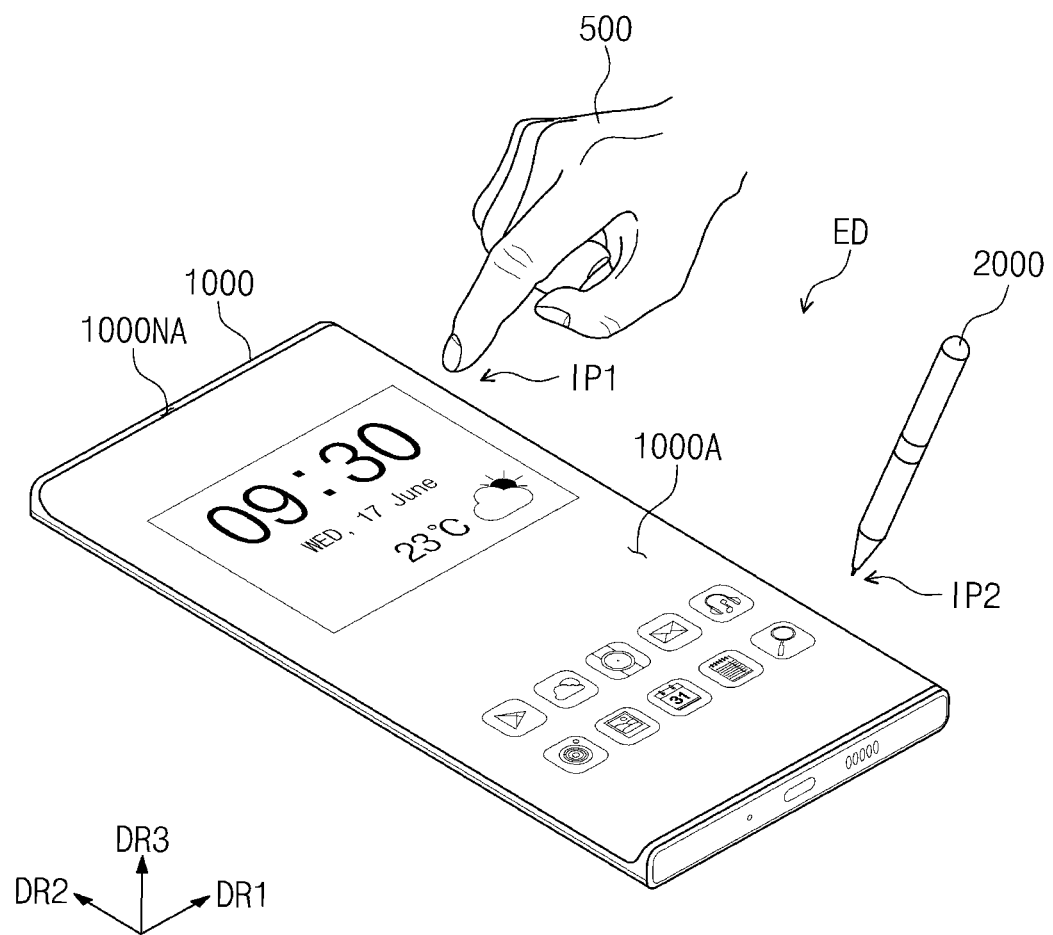
FIGS. 1 and 2 are perspective views illustrating an electronic device according to some example embodiments of the inventive concept.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Aspects of some example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Aspects of some example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The term of "part" or "unit" used in the description of example embodiments may be a software component or a hardware component, which is configured to execute a specific function. The hardware component may include a field programmable gate array (FPGA) or an application specific integrated circuit (ASIC). The software component may refer to data used by executable code and/or data, which are stored in an addressable storage medium and are used by the executable code. Thus, the software components may be, for example, object-oriented software components, class components, and work components and may include processes, functions, properties, procedures, subroutines, program code segments, drivers, firmwares, microcodes, circuits, data, database, data structures, tables, arrays, or variables.

Figure 2:
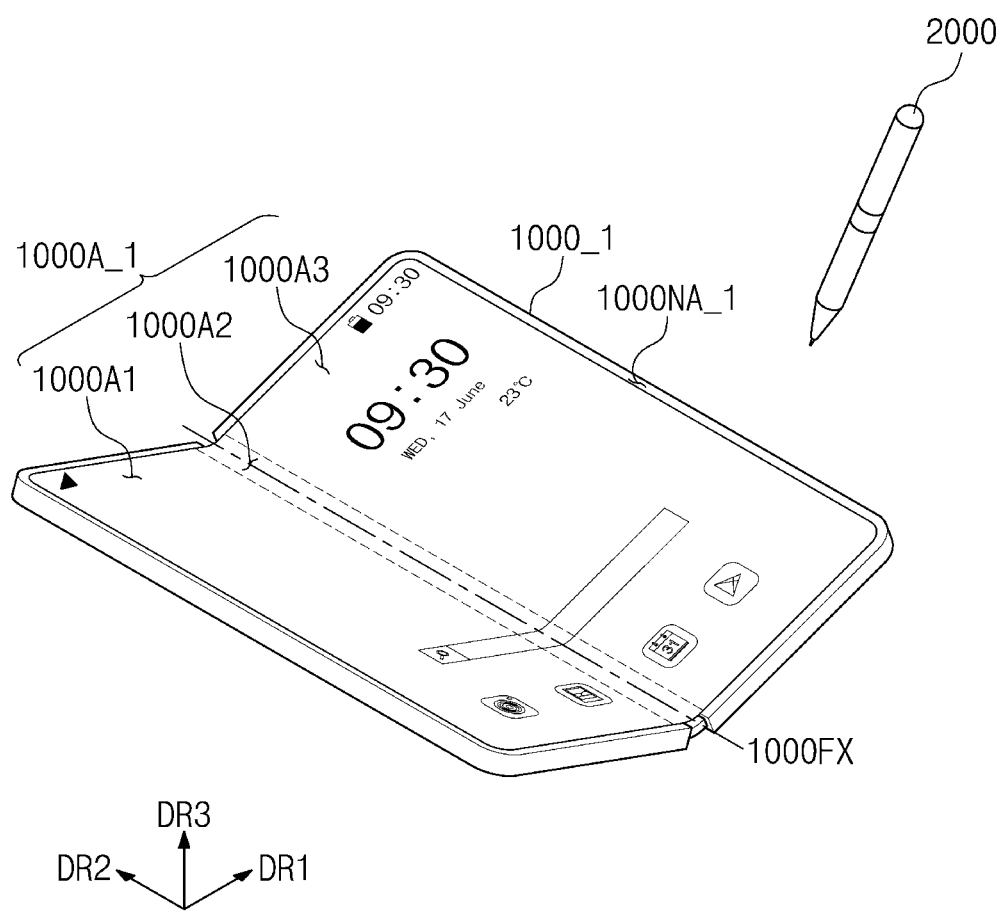

FIGS. 1 and 2 are perspective views illustrating an electronic device ED according to some example embodiments of the inventive concept.

Referring to FIG. 1, the electronic device ED may be a device that is activated by an electrical signal applied thereto. For example, the electronic device ED may be a cellular phone, a tablet, a car navigation system, a gaming machine, or a wearable device but embodiments according to the present disclosure are not limited to these examples. FIG. 1 illustrates an example, in which the electronic device ED is a cellular phone.

The electronic device ED may include a display device 1000 and a second input device 2000 (e.g., a stylus input device). An active region 1000A and a peripheral region 1000NA may be defined in the display device 1000. The display device 1000 may display images at the active region 1000A. The active region 1000A may include a planar surface defined by a first direction DR1 and a second direction DR2. The peripheral region 1000NA may enclose the active region 1000A. That is, the peripheral region 1000NA may be in a periphery (e.g., outside a footprint) of the active region 1000A.

A thickness direction of the display device 1000 may be parallel to a third direction DR3 crossing the first and second directions DR1 and DR2 (e.g., in a direction perpendicular to a plane formed by the first and second directions DR1 and DR2). Thus, a front or top surface and a rear or bottom surface of each member constituting the display device 1000 may be defined, based on the third direction DR3.

The display device 1000 may sense input provided from the outside. For example, the display device 1000 may sense a first input IP1, which is provided by a first input device or object 500, and a second input IP2, which is provided by the second input device or object 2000. The first input device 500 may include any input device configured to provide a touch input to the electronic device ED (e.g., by causing a change in electrostatic capacitance (e.g., a user's body or finger, a passive pen or stylus, etc.)). The second input device 2000 may be an active-type input device (e.g., an active pen), which can provide a driving signal to the display device 1000.

The display device 1000 and the second input device 2000 may communicate with each other in a bidirectional manner. The display device 1000 may provide an up-link signal to the second input device 2000. The second input device 2000 may provide a down-link signal to the display device 1000.

Referring to FIG. 2, a display device 1000_1 may include an active region 1000A_1, which is used to display images. FIG. 2 illustrates the display device 1000_1 that is folded with a specific angle (e.g., along a set or predetermined axis or line 1000FX). When the display device 1000_1 is in an unfolded state (e.g., such that the display device 1000_1 is not folded along the axis 1000FX), the active region 1000A_1 may include a flat surface defined by the first direction DR1 and the second direction DR2.

The active region 1000A_1 may include a first region 1000A1, a second region 1000A2, and a third region 1000A3. The first region 1000A1, the second region 1000A2, and the third region 1000A3 may be sequentially defined in the first direction DR1. The second region 1000A2 may be configured to be bent along a folding axis 1000FX extending in the second direction DR2. Thus, the first region 1000A1 and the third region 1000A3 may be referred to as non-folding regions, and the second region 1000A2 may be referred to as a folding region.

If the display device 1000_1 is folded, the first region 1000A1 and the third region 1000A3 may face each other. Thus, the display device 1000_1 is in a completely folded state, the active region 1000A_1 may not be exposed to the outside, and this folding may be referred to as "in-folding". However, the operation of the display device 1000_1 is not limited to this example.

For example, according to some example embodiments, if the display device 1000_1 is folded, the first region 1000A1 and the third region 1000A3 may be exposed to the outside, such that surfaces of each of the first region 1000A1 and the third region 1000A3 face away from each other. This folding may be referred to as "out-folding".

The display device 1000_1 may be operated in one of the in-folding and out-folding manners. Alternatively, the display device 1000_1 may be operated in both of the in-folding operation and out-folding manners. In this case, the specific region (e.g., the second region 1000A2) of the display device 1000_1 may be commonly folded during the in-folding and out-folding operations.

FIG. 2 illustrates an example, in which one folding region and two non-folding regions are provided, but the numbers of the folding and non-folding regions are not limited thereto. For example, the display device 1000_1 may include three or more non-folding regions and two or more folding regions, each of which is arranged between adjacent ones of the non-folding regions.

FIG. 2 illustrates an example, in which the folding axis 1000FX is extended parallel to the second direction DR2, but embodiments according to the inventive concept are not limited to this example. For example, the folding axis 1000FX may be extended parallel to the first direction DR1. In this case, the first region 1000A1, the second region 1000A2, and the third region 1000A3 may be sequentially arranged in the second direction DR2.

Figure 3A:
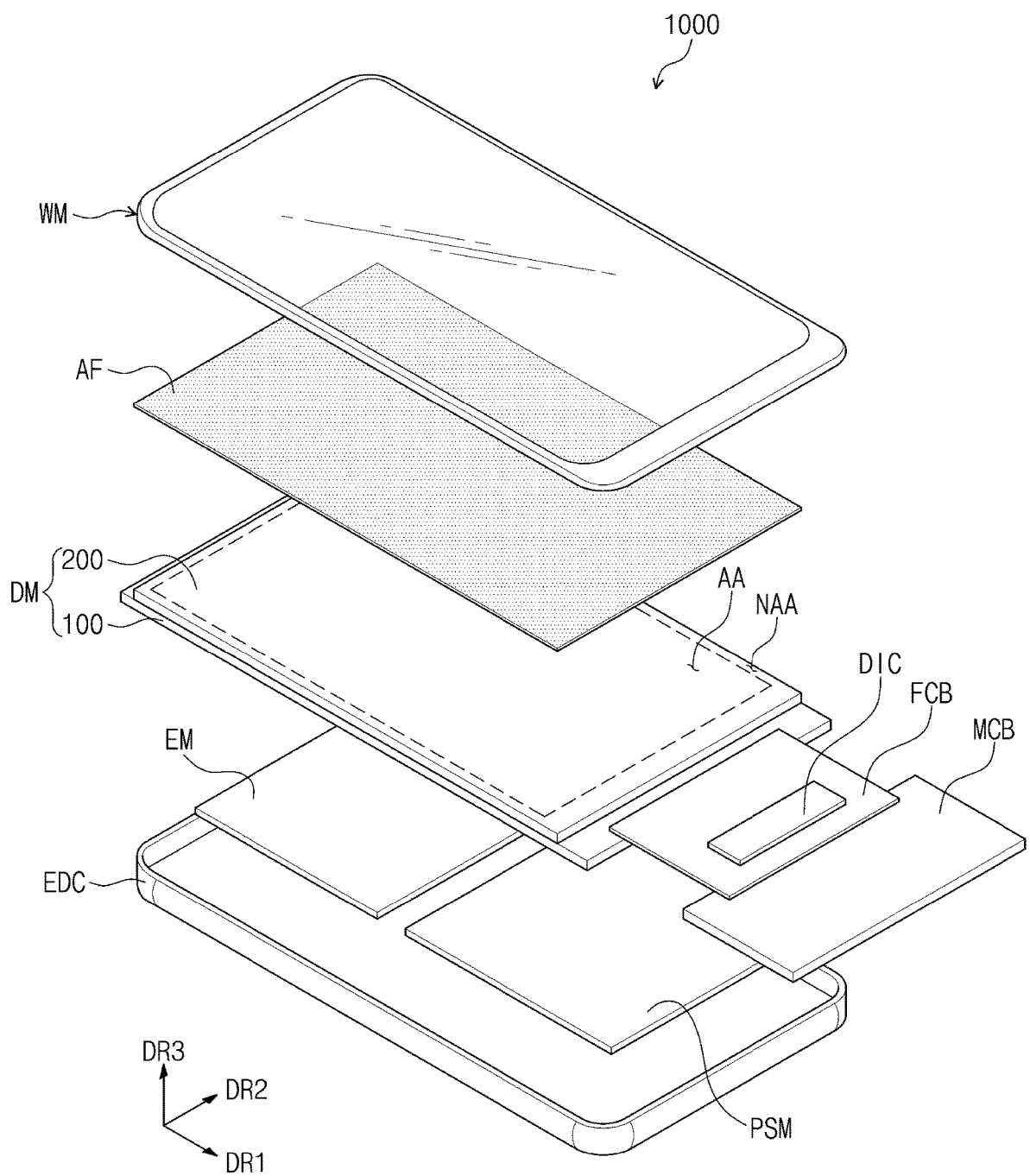
FIG. 3A is an exploded perspective view illustrating a display device according to some example embodiments of the inventive concept.
Figure 3B:
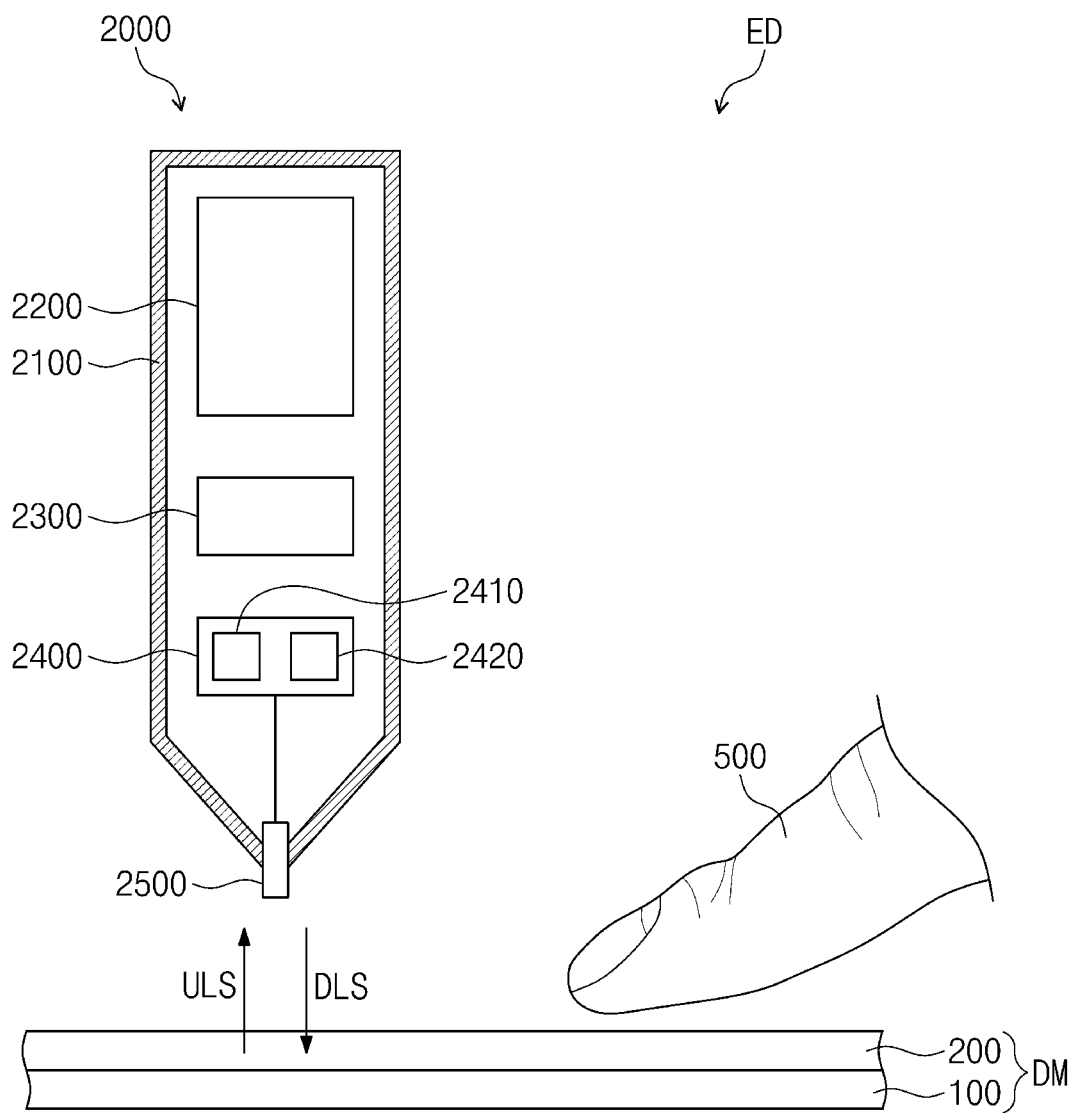
FIG. 3B is a block diagram illustrating a second input device according to some example embodiments of the inventive concept.

FIG. 3A is an exploded perspective view illustrating the display device 1000 according to some example embodiments of the inventive concept. FIG. 3B is a block diagram illustrating the second input device 2000 according to some example embodiments of the inventive concept. The display device 1000 of FIG. 3A is illustrated based on FIG. 1.

As shown in FIG. 3A, the display device 1000 may include a display module DM, an optical member AF, a window WM, an electronic module EM, a power module PSM, and a case EDC.

The display module DM may generate images and may sense an external input. The display module DM may include a display panel 100 and an input sensor 200. The display module DM may include an active region AA and a peripheral region NAA, which respectively correspond to the active region 1000A and the peripheral region 1000NA (e.g., see FIG. 1) of the electronic device ED.

The display panel 100 may be one of light-emitting type display panels, such as an organic light emitting display panel or a quantum-dot light emitting display panel, but embodiments according to the the inventive concept are not limited to a specific kind of display panel. The input sensor 200 will be described in more detail below.

The display module DM may include a main circuit board MCB, a flexible circuit film FCB, and a driving chip DIC. According to some example embodiments, at least one of the main circuit board MCB, the flexible circuit film FCB, or the driving chip DIC may be omitted from the display module DM. The main circuit board MCB may be coupled to the flexible circuit film FCB and may be electrically connected to the display panel 100. The main circuit board MCB may include a plurality of driving elements. The driving elements may include an integrated chip, which is used to drive the display panel 100. The flexible circuit film FCB may be coupled to the display panel 100 to electrically connect the display panel 100 to the main circuit board MCB. The driving chip DIC may be mounted on the flexible circuit film FCB.

The flexible circuit film FCB may be bent such that the main circuit board MCB faces a rear surface of a display device DD. The main circuit board MCB may be electrically connected to the electronic module EM through a connector.

The driving chip DIC may include driving elements (e.g., data driving circuit), which are used to drive pixels of the display panel 100. FIG. 3A illustrates a structure, in which the driving chip DIC is mounted on the flexible circuit film FCB, but embodiments according to the inventive concept are not limited to this example. For example, the driving chip DIC may be directly mounted on the display panel 100. A portion of the display panel 100 may be bent, and a portion, on which the driving chip DIC is mounted, may be arranged to face the rear surface of the display device DD.

According to some example embodiments, the input sensor 200 may be electrically connected to the main circuit board MCB through an additional flexible circuit film. However, embodiments according to the inventive concept are not limited to this example. The input sensor 200 may be electrically connected to the display panel 100 and may be electrically connected to the main circuit board MCB through the flexible circuit film FCB.

The optical member AF may lower reflectance of an external light. The optical member AF may include a polarizer and a retarder. The polarizer and the retarder may be of a stretched-type or a coating-type. The coating-type optical film may have an optical axis that is defined depending on a stretched direction of a functional film. The coating-type optical film may include liquid crystal molecules arranged on a base film.

According to some example embodiments, the optical member AF may be omitted. In this case, the display module DM may further include a color filter and a black matrix, instead of the optical member AF.

The window WM may define an outer surface of the electronic device ED; that is, an outer surface of the window WM may serve as the outer surface of the electronic device ED. The window WM may include a base substrate, and according to some example embodiments, may further include functional layers, such as an anti-reflection layer and anti-fingerprint layer.

According to some example embodiments, the display device DD may further include at least one adhesive layer. The adhesive layer may bond adjacent components of the display device DD to each other. The adhesive layer may be an optically-clear adhesive layer or a pressure-sensitive adhesive layer.

The electronic module EM may include, at least, a main controller. The electronic module EM may include a wireless communication module, an image input module, a sound input module, a sound output module, a memory, an outer interface module, and so forth. The modules may be mounted on the circuit board or may be electrically connected to the circuit board through a flexible circuit board. The electronic module EM may be electrically connected to the power module PSM.

The main controller may control an overall operation of the electronic device ED. For example, the main controller may activate or inactive the display device DD, in accordance with a user's input. The main controller may control operations of the display module DM, the wireless communication module, the image input module, the sound input module, the sound output module, and so forth. The main controller may include at least one micro-processor.

The case EDC may be combined with the window WM. The case EDC may absorb impact exerted from the outside and may prevent or reduce instances of a contamination material or moisture entering the display device DD, and thus, elements contained in the case EDC may be protected. Meanwhile, according to some example embodiments, the case EDC may be a structure that is provided by combining a plurality of container members.

Referring to FIG. 3B, the display module DM may communicate with the second input device 2000 in a bidirectional manner. The second input device 2000 may include a housing 2100, a power module 2200, a control module 2300, a communication module 2400, and a pen tip 2500. However, elements constituting the second input device 2000 are not limited to the elements enumerated above. For example, the second input device 2000 may further include an electrode switch allowing for a switching to a signal transmitting mode or signal receiving mode, a pressure sensor sensing pressure, a memory storing some data, or a gyro-sensor sensing angular velocity.

The housing 2100 may be a pen-shaped structure, in which an empty space is provided. The power module 2200, the control module 2300, the communication module 2400, and the pen tip 2500 may be contained in the empty space of the housing 2100.

The power module 2200 may supply an electric power to the control module 2300 and the communication module 2400 of the second input device 2000. The power module 2200 may include a battery or a large-capacity capacitor.

The control module 2300 may control an operation of the second input device 2000. The control module 2300 may include an application-specific integrated circuit (ASIC).

The communication module 2400 may include a receiving circuit 2410 and a transmitting circuit 2420. The receiving circuit 2410 may receive an up-link signal ULS which is provided from the input sensor 200. The transmitting circuit 2420 may provide a down-link signal DLS to the input sensor 200. The up-link signal ULS may correspond to a signal informing the second input device 2000 of a second mode of an operation of the input sensor 200. The down-link signal DLS may include a driving signal indicating an input of the second input device 2000 and a modulation signal indicating information of the second input device 2000. This will be described in more detail with reference to FIGS. 7C and 7D.

The receiving circuit 2410 may modulate the up-link signal ULS to a signal, which can be processed by the control module 2300. The transmitting circuit 2420 may modulate a signal, which is provided from the control module 2300, to a signal which can be sensed by the input sensor 200.

The pen tip 2500 may be electrically connected to the communication module 2400. The pen tip 2500 may include a protruding portion that is exposed to the outside of the housing 2100. Alternatively, the second input device 2000 may further include a cover housing covering the portion of the pen tip 2500 exposed to the outside of the housing 2100. In certain embodiments, the pen tip 2500 may be placed in the housing 2100.

Meanwhile, in order to realize the bidirectional communication between the input sensor 200 and the second input device 2000, a distance between the second input device 2000 and the input sensor 200 should be smaller than a specific distance. If the distance between the second input device 2000 and the input sensor 200 is maintained within a distance range for sensing of a hovering event, the input sensor 200 may sense the second input device 2000, even when the second input device 2000 is not in direct touch with the input sensor 200.

Figure 4A:
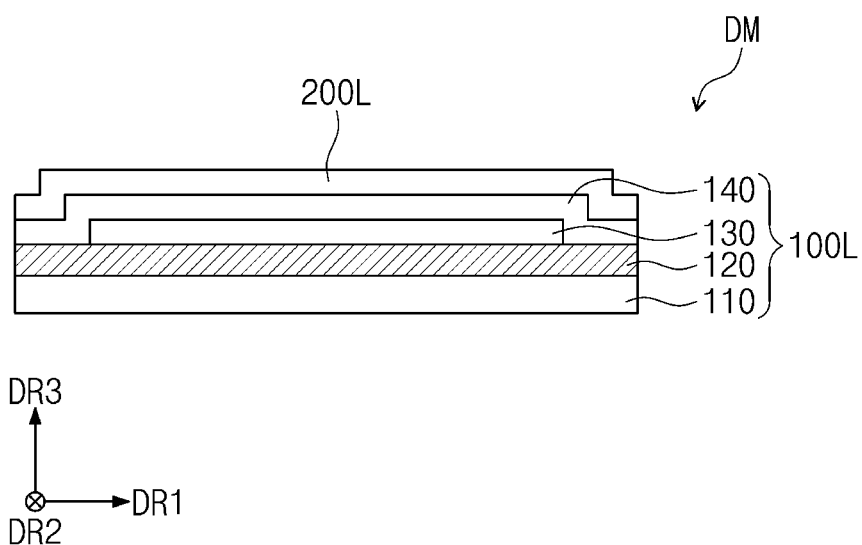
FIG. 4A is a schematic sectional view illustrating a display module according to some example embodiments of the inventive concept.
Figure 4B:
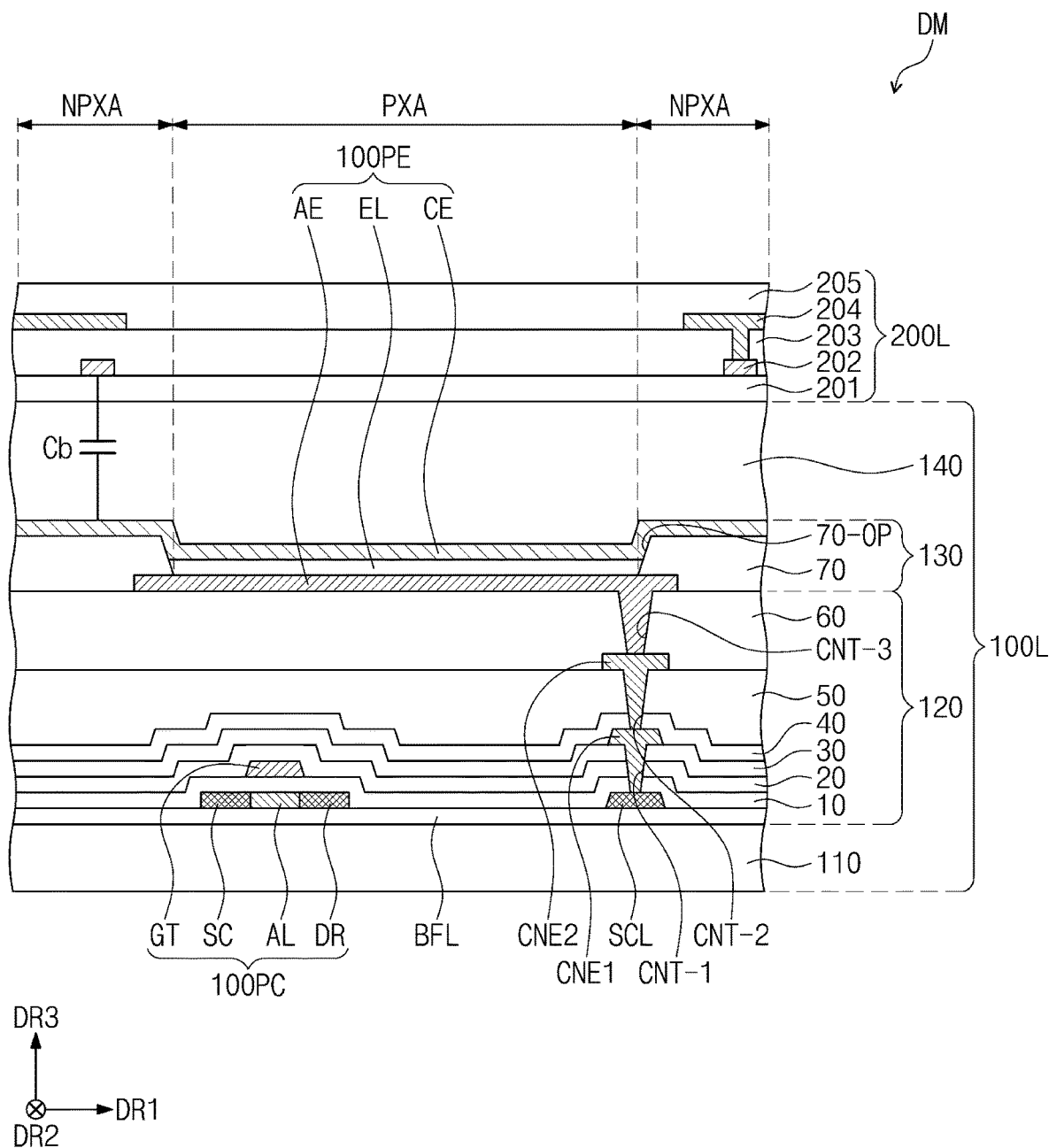
FIG. 4B is an enlarged sectional view illustrating a display module according to some example embodiments of the inventive concept.

FIG. 4A is a schematic sectional view illustrating the display module DM according to some example embodiments of the inventive concept. FIG. 4B is a sectional view illustrating the display module DM according to some example embodiments of the inventive concept.

Referring to FIGS. 4A and 4B, the display module DM may include a display layer 100L and a sensor layer 200L.

The display layer 100L may include a base layer 110, a circuit element layer 120 arranged or disposed on the base layer 110, a display element layer 130 arranged or disposed on the circuit element layer 120, and an encapsulation layer 140 arranged or disposed on the display element layer 130.

The base layer 110 may be a member having a surface, on which the circuit element layer 120 will be arranged. The base layer 110 may be a glass substrate, a metal substrate, or a polymer substrate. But embodiments according to the inventive concept are not limited to this example, and the base layer 110 may be an inorganic layer, an organic layer, or a layer made of a composite material.

The base layer 110 may have a multi-layered structure. For example, the base layer 110 may include a first synthetic resin layer, a silicon oxide (SiOx) layer arranged on the first synthetic resin layer, an amorphous silicon (a-Si) layer arranged on the silicon oxide layer, and a second synthetic resin layer arranged on the amorphous silicon layer. The silicon oxide layer and the amorphous silicon layer may be referred to as a base barrier layer. Alternatively, the base layer 110 may include a first synthetic resin layer, an adhesive layer, and a second synthetic resin layer.

The circuit element layer 120 may be arranged on the base layer 110. The circuit element layer 120 may include an insulating layer, a semiconductor pattern, a conductive pattern, a signal line, and so forth. The formation of the circuit element layer 120 may include forming an insulating layer, a semiconductor layer, and a conductive layer on the base layer 110 using a coating or deposition method and then performing a photolithography process and an etching process several times to selectively pattern the insulating layer, the semiconductor layer, and the conductive layer. Thereafter, the semiconductor pattern of the circuit element layer 120 may be formed from the semiconductor layer, and the conductive pattern and the signal line of the circuit element layer 120 may be formed from the conductive layer.

A buffer layer BFL may be arranged on a top surface of the base layer 110. The buffer layer BFL may be formed of or include at least one inorganic layer. According to some example embodiments, the buffer layer BFL may be omitted.

The semiconductor pattern may be arranged on the buffer layer BFL. The semiconductor pattern may be formed of or include polysilicon. But embodiments according to the inventive concept are not limited to this example, and the semiconductor pattern may be formed of or include at least one of amorphous silicon or metal oxides.

FIG. 4B illustrates a portion of the semiconductor pattern, but the semiconductor pattern may include another portion arranged in other regions. The semiconductor pattern may include portions that are arranged over pixels in a regular manner. Electrical characteristics of the semiconductor pattern may vary depending on its doping state. The semiconductor pattern may include a first region and a second region, which have different doping concentrations from each other. The first region may be doped with n-type or p-type dopants. A p-type transistor may include regions doped with p-type dopants, and an n-type transistor may include regions doped with n-type dopants.

The first region may have higher conductance that the second region and thus may be used as a part of an electrode or a signal line. The second region may have a lower doping concentration than the first region and may be an undoped region. The second region may correspond to substantially an active or channel region a transistor. In other words, the semiconductor pattern may include three different portions, one of which is used as the active region of the transistor, another of which is used as the source or drain region of the transistor, and the other of which is used as a part of a connection electrode or a connection signal line.

Each of the pixels may be configured to have a circuit structure including seven transistors, one capacitor, and a light-emitting element in light, but the circuit structure of the pixel may be variously change. FIG. 4B illustrates an example in which a transistor 100PC and a light-emitting element 100PE are included in the pixel.

A source SC, an active AL, and a drain DR of the transistor 100PC may be parts of the semiconductor pattern. The source SC and the drain DR may be extended from the active AL in opposite directions, when viewed in a sectional view. FIG. 4B illustrates a portion of a connection signal line SCL, which may be another part of the semiconductor pattern. According to some example embodiments, the intermediate signal line SCL may be connected to the drain DR of the transistor 100PC, when viewed in a plan view.

First to sixth insulating layers 10 to 60 may be arranged on the buffer layer BFL. Each of the first to sixth insulating layers 10 to 60 may include an inorganic layer or an organic layer. The first insulating layer 10 may cover the semiconductor pattern. A gate GT of the transistor 100PC may be arranged on the first insulating layer 10. The gate GT may be a portion of a metal pattern. The gate GT may be overlapped with the active AL. According to some example embodiments, the gate GT may be used as a mask in a process of doping the semiconductor pattern.

The second insulating layer 20 may cover the gate GT. The third insulating layer 30 may be arranged on the second insulating layer 20, and according to some example embodiments, the third insulating layer 30 may be a single layer that is made of silicon oxide or silicon nitride.

A first connection electrode CNE1 may be arranged on the third insulating layer 30. The first connection electrode CNE1 may be coupled to the connection signal line SCL through a contact hole CNT-1 penetrating the first, second, and third insulating layers 10, 20, and 30. The fourth insulating layer 40 may be arranged on the third insulating layer 30. The fourth insulating layer 40 may be a single layer composed of a silicon oxide layer. The fifth insulating layer 50 may be arranged on the fourth insulating layer 40. The fifth insulating layer 50 may be an organic layer.

A second connection electrode CNE2 may be arranged on the fifth insulating layer 50. The second connection electrode CNE2 may be coupled to the first connection electrode CNE1 through a contact hole CNT-2 penetrating the fourth insulating layer 40 and the fifth insulating layer 50. The sixth insulating layer 60 may be arranged on the fifth insulating layer 50 to cover the second connection electrode CNE2. The sixth insulating layer 60 may be an organic layer.

The display element layer 130 may be arranged on the circuit element layer 120. The display element layer 130 may include the light-emitting element 100PE. For example, the display element layer 130 may include an organic light emitting material, quantum dots, quantum rods, or micro-LEDs. The description that follows will refer to an example, in which the light-emitting element 100PE is an organic light emitting device, but embodiments according to the inventive concept are not limited to this example.

The light-emitting element 100PE may include a first electrode AE, a light emitting layer EL, and a second electrode CE. The first electrode AE may be arranged on the sixth insulating layer 60. The first electrode AE may be coupled to the second connection electrode CNE2 through a contact hole CNT-3 penetrating the sixth insulating layer 60.

A pixel definition layer 70 may be arranged on the sixth insulating layer 60 to cover a portion of the first electrode AE. An opening 70-OP may be defined in the pixel definition layer 70. The opening 70-OP of the pixel definition layer 70 may expose at least a portion of the first electrode AE.

The active region AA (e.g., see FIG. 2) may include a light-emitting region PXA and a non-light-emitting region NPXA adjacent to the light-emitting region PXA. The non-light-emitting region NPXA may enclose the light-emitting region PXA. According to some example embodiments, the light-emitting region PXA may be defined to correspond to a region of the first electrode AE exposed through the opening 70-OP.

The light emitting layer EL may be arranged on the first electrode AE. The light emitting layer EL may be arranged in a region corresponding to the opening 70-OP. In other words, the light emitting layer EL may include a plurality of patterns, which are locally arranged in respective pixels and are separated from each other, but embodiments according to the inventive concept are not limited to this example. The second electrode CE may be arranged on the light emitting layer EL. The second electrode CE may be a single-continuous pattern that is arranged in common throughout a plurality of pixels.

According to some example embodiments, a hole control layer may be arranged between the first electrode AE and the light emitting layer EL. The hole control layer may be arranged in common in the light-emitting region PXA and the non-light-emitting region NPXA. The hole control layer may include a hole transport layer and, according to some example embodiments, may further include a hole injection layer. An electron control layer may be arranged between the light emitting layer EL and the second electrode CE. The electron control layer may include an electron transport layer and, according to some example embodiments, may further include an electron injection layer. The hole control layer and the electron control layer may be formed in common in a plurality of pixels, using an open mask.

The encapsulation layer 140 may be arranged on the display element layer 130. The encapsulation layer 140 may include an inorganic layer, an organic layer, and an inorganic layer, which are sequentially stacked, but the structure of the encapsulation layer 140 is not limited to this example.

According to some example embodiments, the encapsulation layer 140 may be replaced with an encapsulation substrate. The encapsulation substrate may include a rigid substrate and may be bonded to the base layer 110 or the circuit element layer 120 by a sealant. The encapsulation substrate may hermetically seal the display element layer 130, and the sensor layer 200L may be arranged on a top surface of the encapsulation substrate.

The sensor layer 200L may be formed on the display layer 100L in a successive manner. In this case, it may be expressed that the sensor layer 200L is directly arranged on the display layer 100L. In the present specification, this expression means that an adhesive layer is not arranged between the sensor layer 200L and the display layer 100L. The sensor layer 200L may include a first insulating layer 201, a first conductive layer 202, a second insulating layer 203, a second conductive layer 204, and a third insulating layer 205.

Each of the first, second, and third insulating layers 201, 203, and 205 may be an inorganic layer that is formed of or includes at least one of silicon nitride, silicon oxynitride, or silicon oxide. Each of the first, second, and third insulating layers 201, 203, and 205 may be an organic layer that is formed of or includes at least one of epoxy resins, acrylic resins, or imide resins.

Each of the first and second conductive layers 202 and 204 may have a single-layered structure or a multi-layered structure including a plurality of layers stacked in the third direction DR3. Each of the first and second conductive layers 202 and 204 may include a plurality of conductive patterns.

The conductive layer of the single-layered structure may be formed of or include a metal layer or a transparent conductive layer. The metal layer may be formed of or include at least one of molybdenum, silver, titanium, copper, aluminum, or alloys thereof. The transparent conductive layer may include transparent conductive oxide, such as indium tin oxide (ITO), indium zinc oxide (IZO), zinc oxide (ZnO), or indium tin zinc oxide (ITZO). In certain embodiments, the transparent conductive layer may include a conductive polymer (e.g., PEDOT), metal nanowires, or graphene.

The conductive layer of the multi-layered structure may include metal layers. For example, such metal layers constituting the conductive layer may have a triple-layered structure including, for example, titanium/aluminum/titanium layers. The conductive layer of the multi-layered structure may include at least one metal layer and at least one transparent conductive layer.

The smaller the distance between the display layer 100L and the sensor layer 200L, the greater the likelihood that the sensor layer 200L is affected by a signal provided from the display layer 100L. A capacitance of a base capacitor Cb (i.e., between the first conductive layer 202 and the second electrode CE) may vary depending on an operation of the display layer 100L. The sensor layer 200L may recognize the signal as a noise signal.

Figure 5:
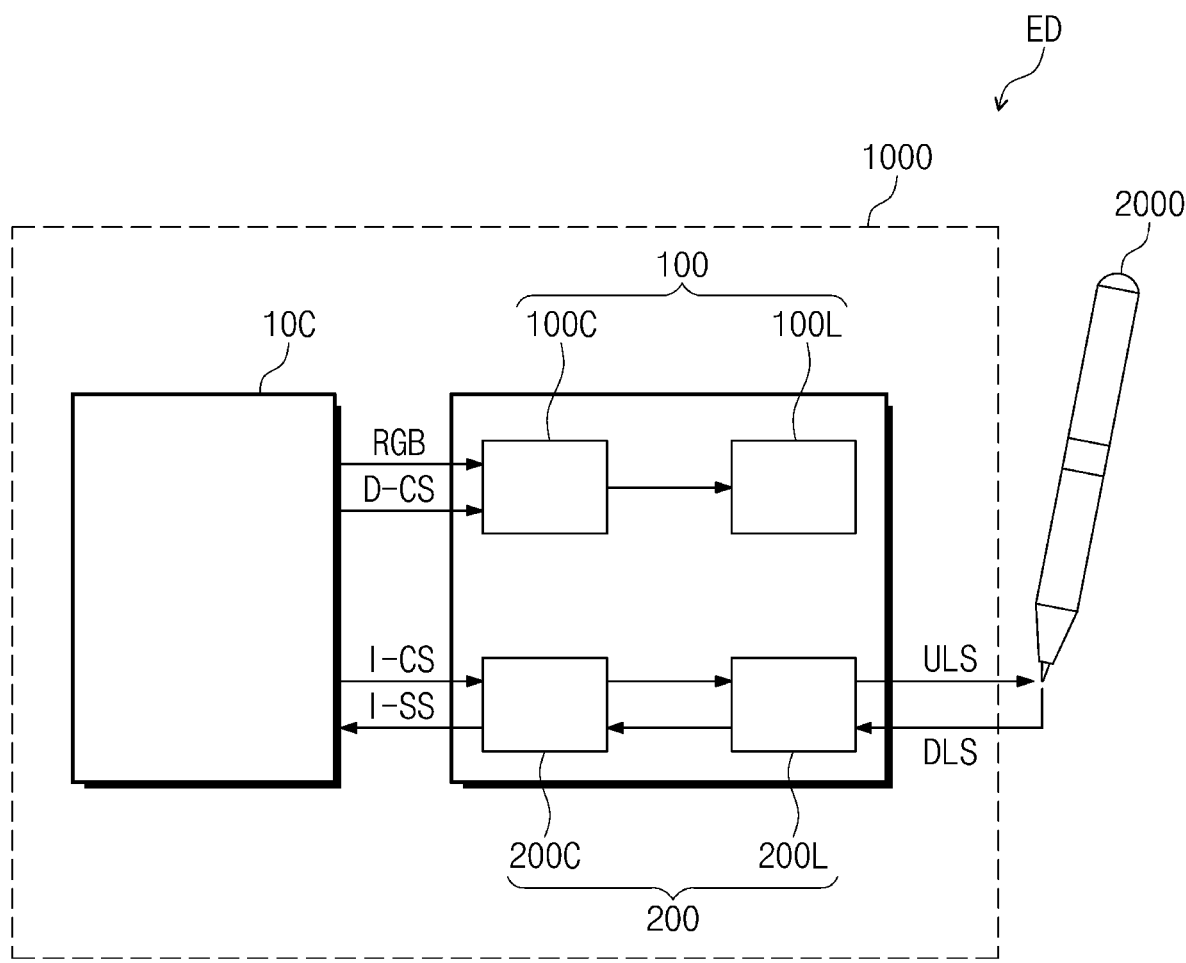
FIG. 5 is a block diagram illustrating an electronic device according to some example embodiments of the inventive concept.

FIG. 5 is a block diagram illustrating the electronic device ED according to some example embodiments of the inventive concept.

Referring to FIG. 5, the display device 1000 may include a main controller 10C, the display layer 100L, a display controller 100C driving the display layer 100L, the sensor layer 200L, and a sensor controller 200C driving the sensor layer 200L.

The display controller 100C may receive an image signal RGB and a control signal D-CS from the main controller 10C. The main controller 10C may include a graphic controller. The control signal D-CS may include various signals. For example, the control signal D-CS may include an input vertical synchronization signal, an input horizontal synchronization signal, a main clock, a data enable signal, and so forth. The display controller 100C may generate a vertical synchronization signal and a horizontal synchronization signal, which are used to control a timing in an operation of providing a signal to the display layer 100L, based on the control signal D-CS.

The sensor controller 200C may receive a control signal I-CS from the main controller 10C. The control signal I-CS may include a mode determination signal, which is used to determine a driving mode of the input sensor, and a clock signal. The sensor controller 200C may be operated in a first mode of sensing the first input IP1 (e.g., see FIG. 1) or in a second mode of sensing the second input IP2 (e.g., see FIG. 1), based on the control signal I-CS. The sensor controller 200C may set one of a first driving mode 1st Mode or a second driving mode 2nd Mode, which will be described below (e.g., FIG. 8A), as a default driving mode, based on the mode determination signal.

The sensor controller 200C may calculate coordinate information on the first or second input, based on signals received from the sensor layer 200L, and then may provide a coordinate signal I-SS, in which the coordinate information is contained, to the main controller 10C. The main controller 10C may execute an operation corresponding to the user input, based on the coordinate signal I-SS. For example, the main controller 10C may operate the display controller 100C to display a new application image on the display layer 100L.

Figure 6:
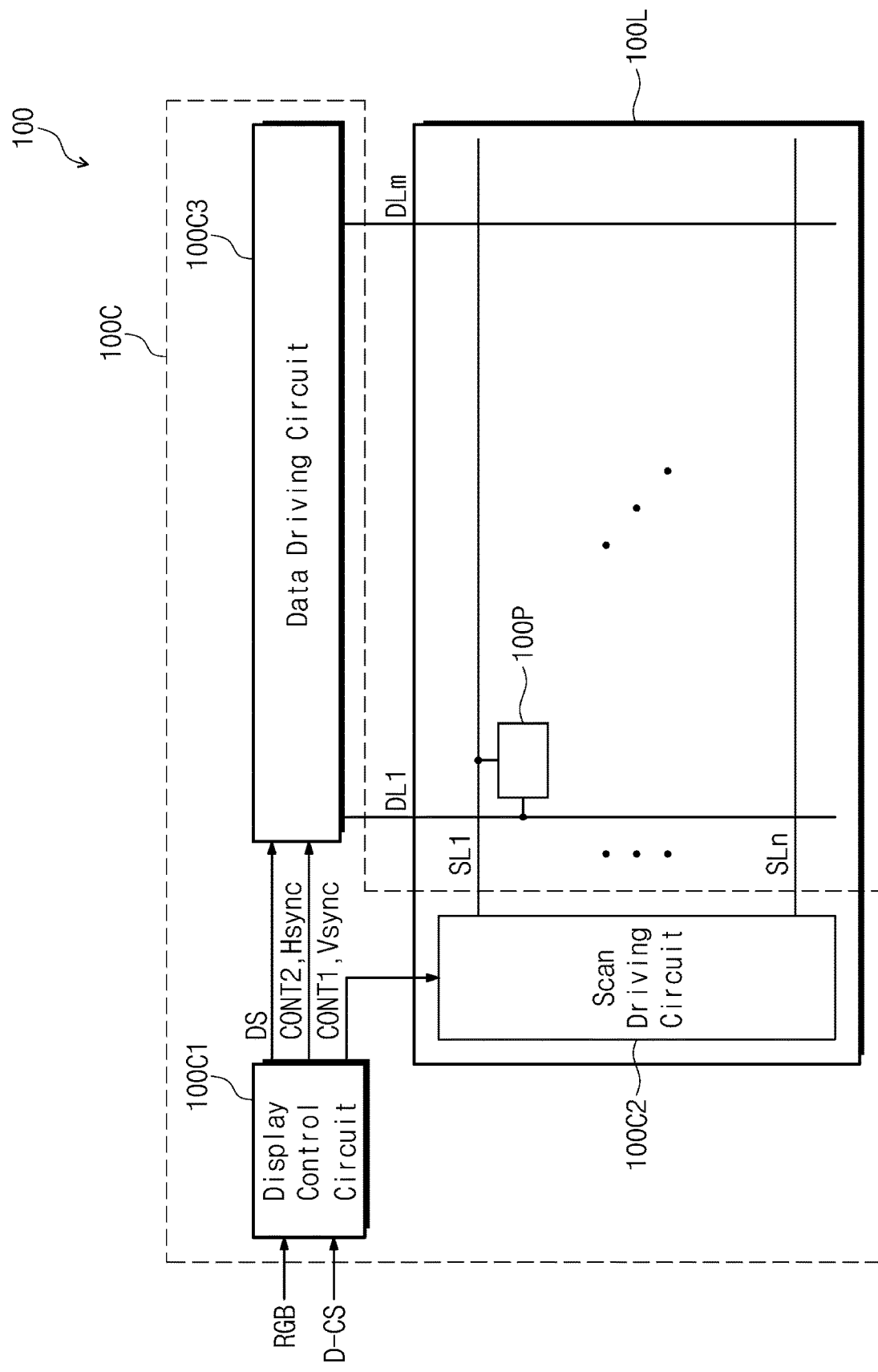
FIG. 6 is a block diagram illustrating a display panel according to some example embodiments of the inventive concept.

FIG. 6 is a block diagram illustrating the display panel 100 according to some example embodiments of the inventive concept.

Referring to FIG. 6, the display panel 100 may include the display layer 100L and the display controller 100C. The display layer 100L may include a plurality of scan lines SL1-SLn, a plurality of data lines DL1-DLm, and a plurality of pixels 100P. Each of the pixels 100P may be connected to a corresponding one of the data lines DL1-DLm and a corresponding one of the scan lines SL1-SLn. The display controller 100C may include a display control circuit 100C1, a scan driving circuit 100C2, and a data driving circuit 100C3. According to some example embodiments, the display layer 100L may further include light-emitting control lines, and the display controller 100C may further include a light-emitting driving circuit providing control signals to the light-emitting control lines. Embodiments according to the inventive concept are not limited to a specific structure of the display panel 100.

The display control circuit 100C1 may generate a first control signal CONT1 and a vertical synchronization signal Vsync, based on the control signal D-CS input thereto, and then may output the first control signal CONT1 and the vertical synchronization signal Vsync to the scan driving circuit 100C2.

The display control circuit 100C1 may generate a second control signal CONT2 and a horizontal synchronization signal Hsync, based on the control signal D-CS, and then may output the second control signal CONT2 and the horizontal synchronization signal Hsync to the data driving circuit 100C3. In addition, the display control circuit 100C1 may output a data signal DS, which is generated by processing the image signal RGB to be suitable for an operation condition of the display layer 100L, to the data driving circuit 100C3. The first control signal CONT1 and the second control signal CONT2 may not be limited to signals required for the operation of the scan driving circuit 100C2 and the data driving circuit 100C3.

The scan driving circuit 100C2 may drive the scan lines SL1-SLn in response to the first control signal CONT1 and the vertical synchronization signal Vsync. According to some example embodiments, the scan driving circuit 100C2 may be formed by the same process as that for the circuit element layer 120 (e.g., see FIG. 4B) in the display layer 100L, but embodiments according to the inventive concept are not limited to this example. For example, the scan driving circuit 100C2 may be prepared in the form of an integrated circuit (IC). In this case, the scan driving circuit 100C2 may be directly mounted on a specific region of the display layer 100L or may be mounted on an additional printed circuit board in a chip-on-film (COF) manner and then may be electrically connected to the display layer 100L.

The data driving circuit 100C3 may output gradation voltages to the data lines DL1-DLm, in response to the second control signal CONT2, the horizontal synchronization signal Hsync, and the data signal DS from the display control circuit 100C1. The data driving circuit 100C3 may be prepared in the form of an integrated circuit (IC). In this case, the data driving circuit 100C3 may be directly mounted on a specific region of the display layer 100L or may be mounted on an additional printed circuit board in a COF manner and then may be electrically connected to the display layer 100L, but embodiments according to the inventive concept are not limited to this example. For example, the data driving circuit 100C3 may be formed by the same process as that for the circuit element layer 120 (e.g., see FIG. 4B) in the display layer 100L.

Figure 7A:
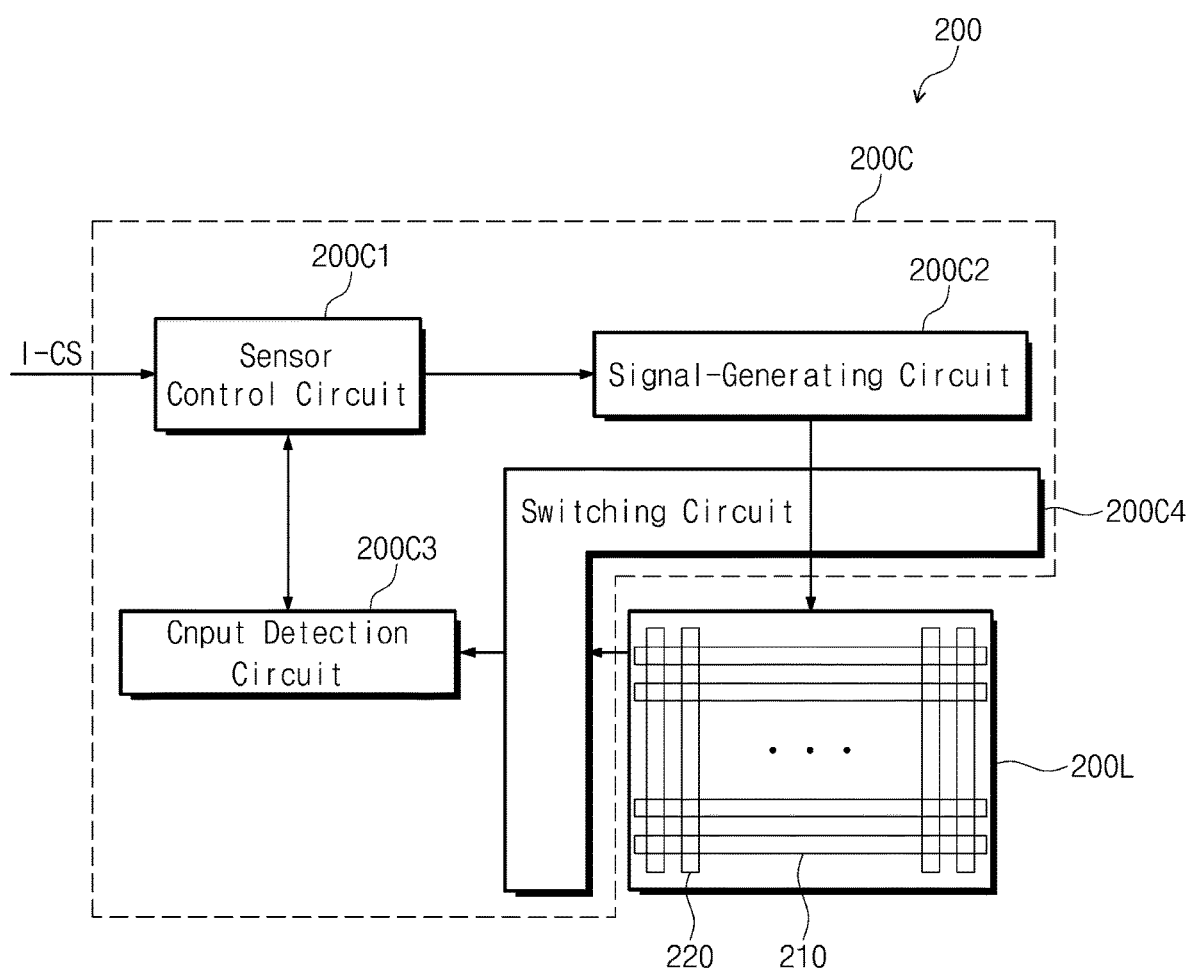
FIG. 7A is a block diagram illustrating an input sensor according to some example embodiments of the inventive concept.
Figure 7B:
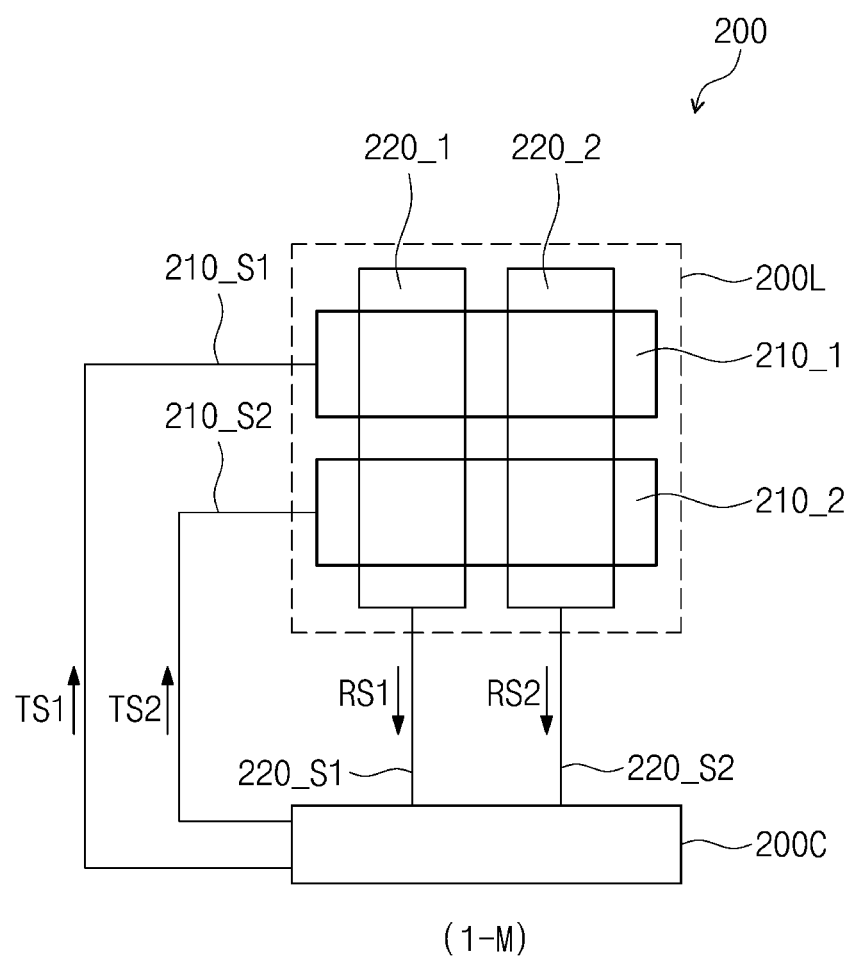
FIG. 7B illustrates a first mode of an operation of an input sensor according to some example embodiments of the inventive concept.
Figure 7C:
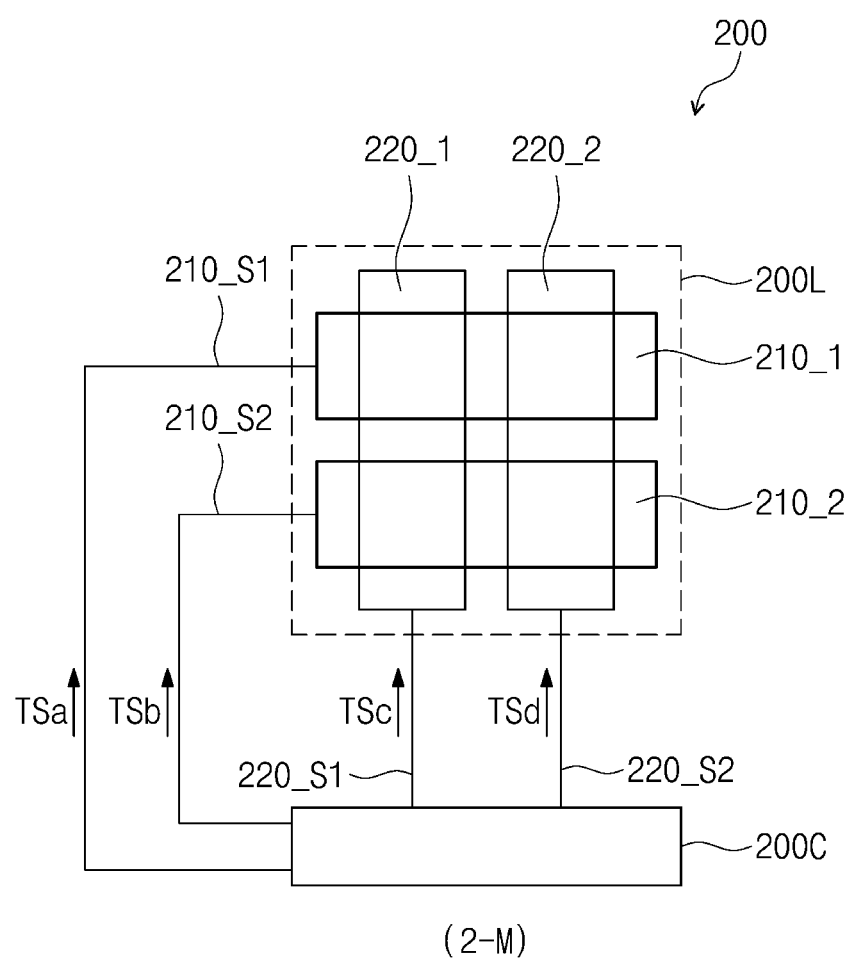
FIGS. 7C and 7D illustrate a second mode of an operation of an input sensor according to some example embodiments of the inventive concept.
Figure 7D:
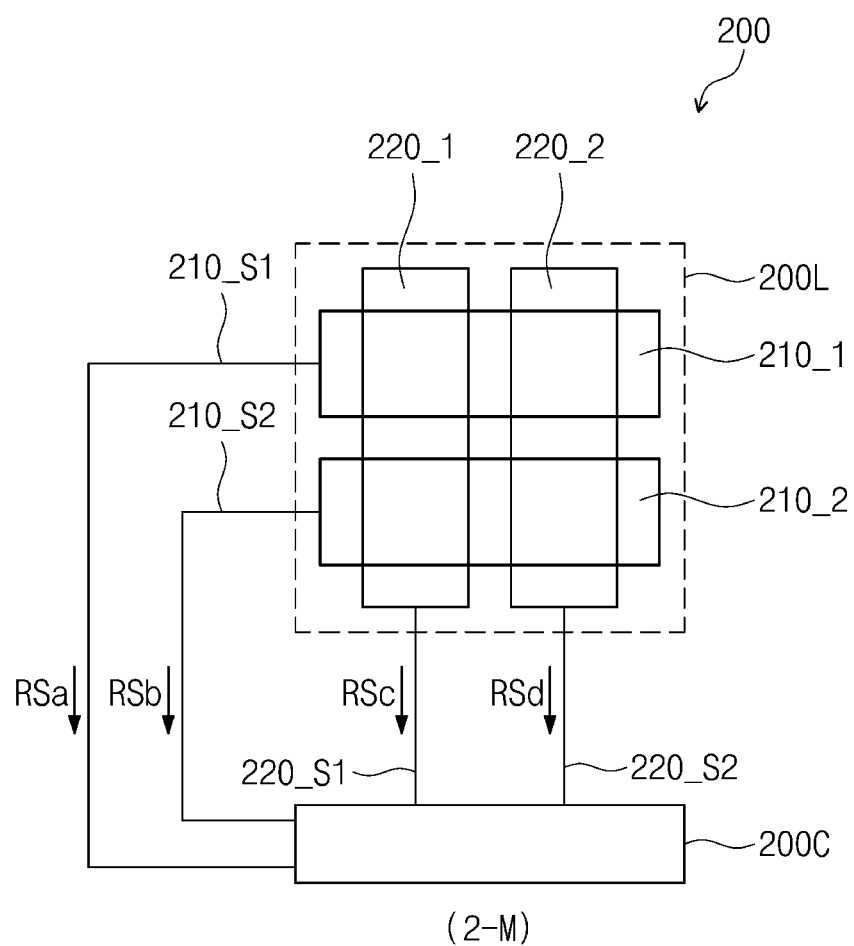

FIG. 7A is a block diagram illustrating the input sensor 200 according to some example embodiments of the inventive concept. FIG. 7B illustrates a first mode 1-M of an operation of the input sensor 200 according to some example embodiments of the inventive concept. FIGS. 7C and 7D illustrate a second mode 2-M of the operation of the input sensor 200 according to some example embodiments of the inventive concept.

Referring to FIG. 7A, the sensor layer 200L may include a plurality of first sensing electrodes 210 (hereinafter, first electrodes) and a plurality of second sensing electrodes 220 (hereinafter, second electrodes), which are provided to cross the first electrodes and are electrically disconnected from the first electrodes. According to some example embodiments, the sensor layer 200L may further include signal lines that are connected to the first and second electrodes 210 and 220. Each of the first and second electrodes 210 and 220 may have a bar shape or a stripe shape. These shapes of the first and second electrodes 210 and 220 may improve a sensing property to successive linear inputs. However, the shapes of the first and second electrodes 210 and 220 are not limited to this example.

Each of the first and second electrodes 210 and 220 may have a mesh shape. Each of the first and second electrodes 210 and 220 may include first extension lines and second extension lines, which are arranged to cross each other. The first and second extension lines crossing each other may form a mesh-shaped electrode. Bridge patterns may be respectively arranged at intersection regions of the first and second electrodes 210 and 220 (e.g., at intersection regions of the first and second extension lines). One of the first and second conductive layers 202 and 204 may include the bridge patterns, and the other may include the first extension lines and the second extension lines. The bridge patterns may connect cut portions of the first and second extension lines to each other.

The sensor controller 200C may include a sensor control circuit 200C1, a signal-generating circuit 200C2, an input detection circuit 200C3, and a switching circuit 200C4. The sensor control circuit 200C1, the signal-generating circuit 200C2, and the input detection circuit 200C3 may be integrated in a single chip or in at least two different chips. According to some example embodiments, at least one of the sensor control circuit 200C1, the signal-generating circuit 200C2, or the input detection circuit 200C3 may include at least two portions that are integrated in at least two different chips.

The sensor control circuit 200C1 may control the operations of the signal-generating circuit 200C2 and the switching circuit 200C4, may calculate coordinates of an external input from a driving signal received from the input detection circuit 200C3, or may analyze information, which is transmitted from the active pen, from a modulation signal received from the input detection circuit 200C3.

The signal-generating circuit 200C2 may provide a driving signal, which will be called "TX signal", to the sensor layer 200L. The signal-generating circuit 200C2 may output a driving signal, which is suitable for an operation mode.

The input detection circuit 200C3 may convert an analog signal, which is received from the sensor layer 200L and will be called "RX signal", to a digital signal. The input detection circuit 200C3 may amplify the received analog signal and may perform a filtering operation thereon. The input detection circuit 200C3 may convert the signal, on which the filtering operation has been performed, to a digital signal.

The switching circuit 200C4 may selectively control an electric connection between the sensor layer 200L and the signal-generating circuit 200C2 and/or between the sensor layer 200L and the input detection circuit 200C3, under the control of the sensor control circuit 200C1. The switching circuit 200C4 may connect one of the groups of the first and second electrodes 210 and 220 to the signal-generating circuit 200C2 or may connect each of the first and second electrodes 210 and 220 to the signal-generating circuit 200C2, under the control of the sensor control circuit 200C1. In addition, the switching circuit 200C4 may connect one or both of the groups of the first and second electrodes 210 and 220 to the input detection circuit 200C3.

Each of FIGS. 7B to 7D illustrates a pair of first electrodes 210_1 and 210_2, which constitute the first electrodes 210, and a pair of second electrodes 220_1 and 220_2, which constitute the second electrodes 220. As illustrated in each of FIGS. 7B to 7D, four signal lines 210_S1, 210_S2, 220_S1, and 220_S2 may be provided to connect the sensor controller 200C to the pair of first electrodes 210_1 and 210_2 and to connect the sensor controller 200C to the pair of second electrodes 220_1 and 220_2.

Referring to FIG. 7B, in the first mode 1-M, the sensor controller 200C may operate the first electrodes 210_1 and 210_2 and the second electrodes 220_1 and 220_2 as different groups. One of the first electrodes 210_1 and 210_2 and the second electrodes 220_1 and 220_2 may be operated as a transmission electrode, and the other may be operated as a reception electrode. In FIG. 7B, the first electrodes 210_1 and 210_2 are illustrated as the transmission electrodes, whereas the second electrodes 220_1 and 220_2 are illustrated as the reception electrodes. Driving signals TS1 and TS2 are illustrated to be provided to one-side ends of the first electrodes 210_1 and 210_2, but according to some example embodiments, the corresponding driving signals TS1 and TS2 may be provided to opposites ends of each of the first electrodes 210_1 and 210_2. The sensor controller 200C may receive sensing signals RS1 and RS2 from the second electrodes 220_1 and 220_2. The sensor controller 200C may sense a change in electrostatic capacitance between the first electrodes 210_1 and 210_2 and the second electrodes 220_1 and 220_2 to sense the first input IP1 (e.g., see FIG. 1).

Referring to FIGS. 7C and 7D, in the second mode 2-M, the sensor controller 200C may operate the first electrodes 210_1 and 210_2 and the second electrodes 220_1 and 220_2 as the same group. Each of the first electrodes 210_1 and 210_2 and the second electrodes 220_1 and 220_2 may be operated as the transmission electrodes and may be operated as the reception electrodes. According to some example embodiments, one of the groups of the first electrodes 210_1 and 210_2 and the second electrodes 220_1 and 220_2 may be operated as the transmission electrodes. However, all of the first electrodes 210_1 and 210_2 and the second electrodes 220_1 and 220_2 may be commonly operated as at least the reception electrodes.

Referring to FIG. 7C, during a specific period (hereinafter, a first period), the first electrodes 210_1 and 210_2 and the second electrodes 220_1 and 220_2 may receive up-link signals TSa, TSb, TSc, and TSd, respectively, from the sensor controller 200C. During the first period, the first electrodes 210_1 and 210_2 and the second electrodes 220_1 and 220_2 may be respectively operated as the transmission electrodes for providing the up-link signals TSa, TSb, TSc, and TSd to the second input device 2000 (e.g., see FIG. 5).

During a specific period (hereinafter, a second period) after first period, the first electrodes 210_1 and 210_2 and the second electrodes 220_1 and 220_2 may receive down-link signals RSa, RSb, RSc, and RSd, respectively, which are provided from the second input device 2000. During the second period, the first electrodes 210_1 and 210_2 and the second electrodes 220_1 and 220_2 may be respectively operated as the reception electrodes for providing the down-link signals RSa, RSb, RSc, and RSd to the sensor controller 200C. In other words, all of the first and second electrodes 210_1, 210_2, 220_1, and 220_2 may be used as the transmission electrodes or may be used as the reception electrodes.

Figure 8A:
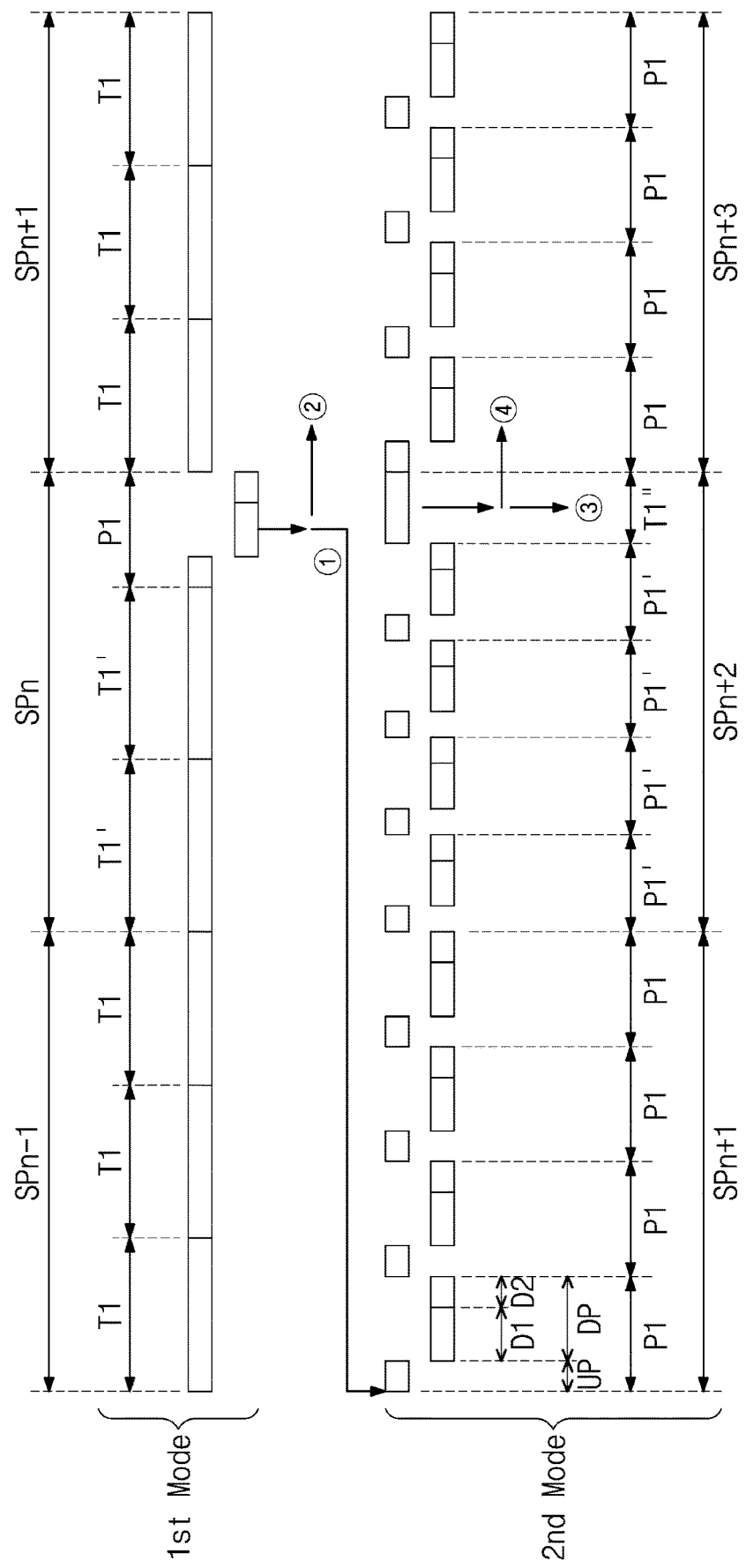
FIG. 8A is a conceptual diagram illustrating an operation of an input sensor according to some example embodiments of the inventive concept.

FIG. 8A is a conceptual diagram illustrating an operation of the input sensor 200 according to some example embodiments of the inventive concept. This operation will be described in more detail with reference to FIG. 8A, in conjunction with FIGS. 5 to 7D.

The input sensor 200 may be operated in two different modes (e.g., a first driving mode 1st Mode or a second driving mode 2nd Mode). One of the first driving mode 1st Mode or the second driving mode 2nd Mode may be set as a default mode by a user's choice and may be switched to the other depending on whether the first input IP1 (e.g., see FIG. 1) or the second input IP2 (e.g., see FIG. 1) is sensed. Hereinafter, an example, in which the first driving mode 1st Mode is set as the default driving mode, will be explained.

In each of the first driving mode 1st Mode and the second driving mode 2nd Mode, the operation of the sensor controller 200C may be executed in both of the first and second modes 1-M described with reference to FIG. 7B and FIGS. 7C and 7D. However, a main operation mode may be differently set depending on its driving mode. In the first driving mode 1st Mode, the operation of the first mode 1-M (e.g., see FIG. 7B) may be set as the main operation mode, whereas in the second driving mode 2nd Mode, the operation of the second mode 2-M (e.g., see FIGS. 7C and 7D) may be set as the main operation mode.

The input sensor 200 may be operated in the first driving mode 1st Mode or the second driving mode 2nd Mode, during a plurality of sensing periods SPn−1, SPn, SPn+1, SPn+2, and SPn+3. The sensing periods SPn−1, SPn, SPn+1, SPn+2, and SPn+3 may be set to have the same time interval. For convenience in description, when the sensing periods SPn−1, SPn, and SPn+1 are operated in the first driving mode 1st Mode, they will be referred to as a first group of sensing periods SPn−1, SPn, and SPn+1, and when the sensing periods SPn−1, SPn, and SPn+1 are operated in the second driving mode 2nd Mode, they may be referred to as a second group of the sensing periods SPn+1, SPn+2, and SPn+3. If there is no need to differentiate the first group from the second group, the sensing periods may be mentioned as a sensing period or an i-th sensing period, where "i" depends on the context.

During each of the sensing periods SPn−1, SPn, and SPn+1 of the first group, the sensor controller 200C may execute the operation of the first mode 1-M several times. During each of the sensing periods SPn+1, SPn+2, and SPn+3 of the second group, the sensor controller 200C may execute the operation of the second mode 2-M several times. A period of each operation of the first mode 1-M executed by the sensor controller 200C may be defined as a first mode period T1 or T1'. A period of each operation of the second mode 2-M executed by the sensor controller 200C may be defined as a second mode period P1 or P1'.

The input sensor 200 may repeat the same operation by units of i successive sensing periods of the sensing periods SPn−1, SPn, SPn+1, SPn+2, and SPn+3, where i is a natural number that is equal to or larger than 2. For example, according to some example embodiments, the number i may be 3. During the operation in the first driving mode 1st Mode, the input sensor 200 may repeat operations of the sensing period SPn−1 of the (n−1)-th first group, the sensing period SPn of the n-th first group, and the sensing period SPn+1 of the (n+1)-th first group, by units of three sensing periods.

The sensing periods SPn−1, SPn, and SPn+1 of the first group may include a plurality of first mode periods T1 and T1'. One of the i sensing periods SPn−1, SPn, and SPn+1 of the first group may include at least one second mode period P1, during which the sensor controller 200C is operated in the second mode 2-M. FIG. 8A illustrates an example, in which the sensing period SPn of the n-th first group includes the second mode period P1.

Each of the sensing period SPn−1 of the (n−1)-th first group and the sensing period SPn+1 of the (n+1)-th first group may include m first mode periods T1, where m is a natural number that is equal to or larger than 2. According to some example embodiments, the number m may be 3. The sensing period SPn of the n-th first group including the second mode period P1 may include the first mode periods T1', the number of which is less than m. In the case where the second mode period P1 is shorter than a typical length of the first mode period T1, the first mode period T1' of the sensing period SPn of the n-th first group may be longer than the first mode period T1 of the sensing period SPn−1 of the (n−1)-th first group and the sensing period SPn+1 of the (n+1)-th first group. Of course, the reverse may be also possible.

During substantially three sensing periods SPn−1, SPn, and SPn+1 of the first group, an operation time of the first mode 1-M of the sensor controller 200C may be longer than an operation time of the second mode 2-M. In the case where the first driving mode 1st Mode is set as the default mode, the sensor controller 200C may be operated in the first mode 1-M to detect the first input IP1 (e.g., see FIG. 1). Next, the sensor controller 200C may determine whether the second input IP2 (e.g., see FIG. 1) occurred in the second mode period P1. If the second input IP2 is detected in the second mode period P1 of the sensing period SPn of the n-th first group as shown in FIG. 8A, the sensor controller 200C may change its driving mode from the first driving mode 1st Mode to the second driving mode 2nd Mode, as depicted by the reference numeral ①. If the second input IP2 is not detected in the second mode period P1 of the sensing period SPn of the n-th first group, the first driving mode 1st Mode may be maintained, as depicted by the reference numeral ②. In the driving mode according to some example embodiments, it may be possible to improve the sensing sensitivity of the first input IP1 and to prevent an unnecessary operation, compared with a driving mode, in which the first mode period T1 and the second mode period P1 are regularly repeated.

If as depicted by the reference numeral ①, the driving mode is changed to the second driving mode 2nd Mode, the input sensor 200 may repeat the same operation by units of k successive sensing periods of the sensing periods SPn+1, SPn+2, and SPn+3, where k is a natural number that is equal to or larger than 2. For example, according to some example embodiments, the number k is 3. During the operation in the second driving mode 2nd Mode, the input sensor 200 may repeat operations of the sensing period SPn+1 of the (n+1)-th second group, the sensing period SPn+2 of the (n+2)-th second group, and the sensing period SPn+3 of the (n+3)-th second group by units of three sensing periods.

The sensing periods SPn+1, SPn+2, and SPn+3 of the second group may include a plurality of second mode periods P1 and P1'. One of the k sensing periods SPn+1, SPn+2, and SPn+3 of the first group may include at least one first mode period T1", during which the sensor controller 200C is operated in the first mode 1-M. FIG. 8A illustrates an example, in the sensing period SPn+2 of the (n+2)-th second group includes the first mode period T1".

Each of the second mode periods P1 and P1' may include an up-link period UP, during which the operation of FIG. 7C is executed, and a down-link period DP, during which the operation of FIG. 7D is executed. The down-link period DP may include a first period D1, during which the sensor layer 200L (e.g., see FIG. 7D) receives a driving signal of a second mode, and a second period D2, during which the sensor layer 200L receives a modulation signal. The driving signal of the second mode, which is output by the second input device 2000 (e.g., see FIG. 5), may be an oscillation signal, which is continuously transmitted during the first period D1 and is called "burst signal". The modulation signal indicating information of the second input device 2000 may include input or writing pressure information or slope information and may include information of one or more bits, which are generated by controlling the oscillation signal to a high-level or low-level, in a specific period. The modulation signal may be generated by modulating the oscillation signal in an amplitude-shift-keying (ASK) or on-off-keying (OOK) manner.

According to some example embodiments, an idle time, in which the sensor controller 200C or the second input device 2000 is not operated, may exist between the first mode periods T1 and T1', between the second mode periods P1 and P1', and between the first mode period T1 or T1' and the second mode period P1 or P1'. Such an idle time may exist between the up-link period UP and the down-link period DP. According to some example embodiments, the second period D2 may be omitted. The second input device 2000 and the display device 1000 (e.g., see FIG. 5) may transmit the information of the second input device 2000 through an additional communication module.

Each of the sensing periods SPn+1, SPn+2, and SPn+3 of the second group may include p second mode periods P1 or P1', where p is a natural number that is equal to or larger than 2. According to some example embodiments, the number p is 4. The sensing period SPn+2 of the (n+2)-th second group including the first mode period T1" may include the second mode period P1' that is relatively short.

According to some example embodiments, the sensing period SPn+2 of the second group, which includes the first mode period T1", may include the second mode periods P1', the number of which is less than that in others of the k sensing periods SPn+1, SPn+2, and SPn+3 (i.e., SPn+1 and SPn+3), which do not include the first mode period T1". Here, a length of the second mode period P1' may be substantially equal to a length of the second mode period of the sensing periods SPn+1 and SPn+3, which do not include the first mode period T1".

During substantially three sensing periods SPn+1, SPn+2, and SPn+3 of the second group, the operation time of the sensor controller 200C in the second mode 2-M may be longer than that in the first mode 1-M. In the case where the second input IP2 (e.g., see FIG. 5) is detected, the sensor controller 200C may be mainly operated in the second mode 2-M to uninterruptedly sense the continuous use of the second input device 2000 (e.g., see FIG. 5). And, if, as shown in FIG. 8A, the first input IP1 is sensed during the first mode period T1", the sensor controller 200C may change the driving mode from the second driving mode 2nd Mode to the first driving mode 1st Mode, as depicted by the reference numeral ③. If the first input IP1 is not sensed during the first mode period T1", the second driving mode 2nd Mode may be maintained, as depicted by the reference numeral ④.

Figure 8B:
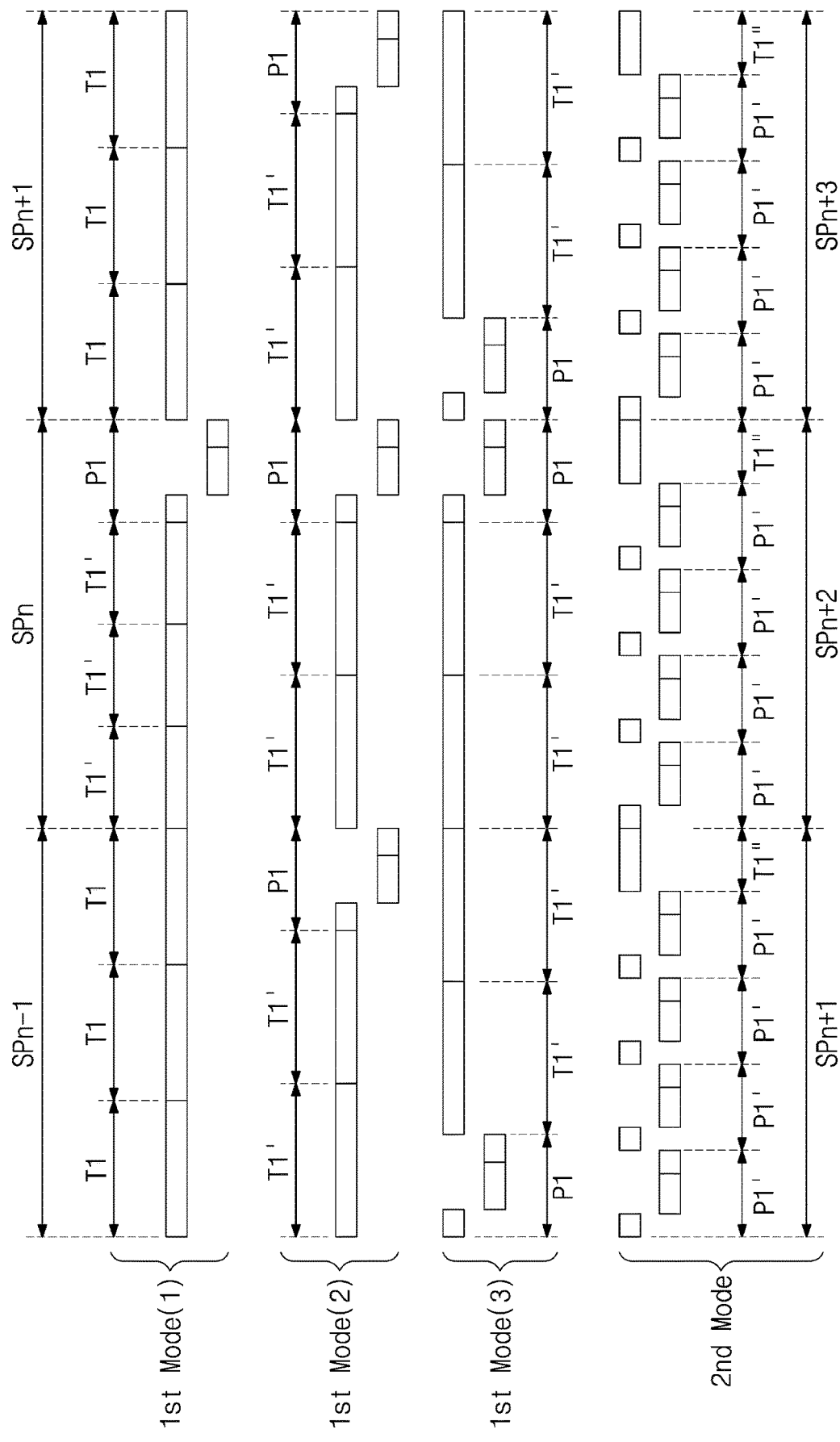
FIG. 8B is a conceptual diagram illustrating an operation of an input sensor according to some example embodiments of the inventive concept.
Figure 8C:
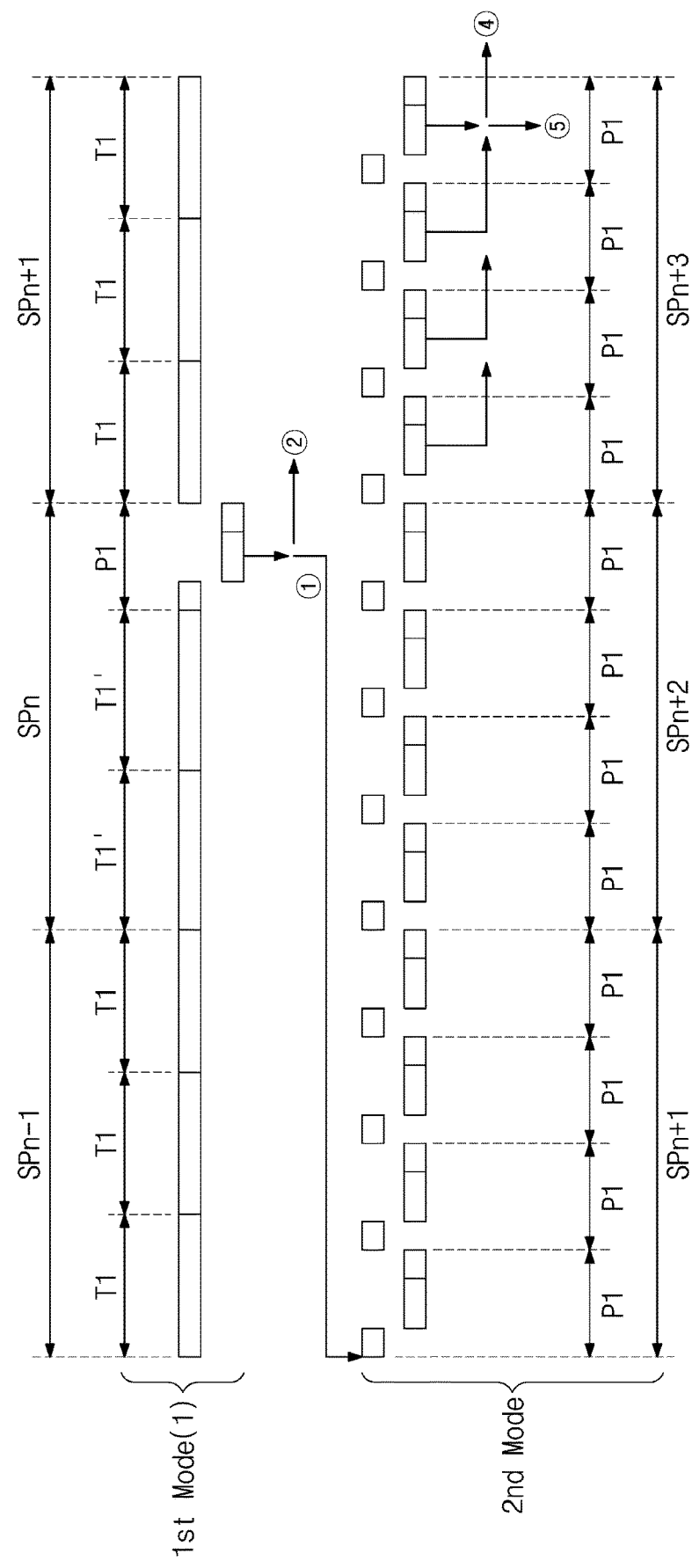
FIG. 8C is a conceptual diagram illustrating an operation of an input sensor according to some example embodiments of the inventive concept.

FIG. 8B is a conceptual diagram illustrating an operation of the input sensor 200 according to some example embodiments of the inventive concept. FIG. 8C is a conceptual diagram illustrating an operation of the input sensor 200 according to some example embodiments of the inventive concept. For concise description, an element previously described with reference to FIGS. 1 to 8A will be identified by the same reference number without repeating an overlapping description thereof.

FIG. 8B illustrates an example of three first driving modes 1st Mode(1), 1st Mode(2), and 1st Mode(3), which are different from the first driving mode 1st Mode described with reference to FIG. 8A. FIG. 8B illustrates an example of one second driving mode 2nd Mode, which is different from the second driving mode described with reference to FIG. 8A.

Referring to the first one 1st Mode(1) of the first driving modes of FIG. 8B, i sensing periods SPn−1, SPn, and SPn+1 of the first group may include the same number of the first mode periods T1 or T1'. The sensing period SPn of the n-th first group including the second mode period P1 may include the first mode period T1' that is shorter than the first mode period T1 of other sensing periods SPn−1 and SPn+1. The constancy in the number of the first mode period T1' may be achieved by reducing pulse widths of the driving signals TS1 and TS2 (e.g., see FIG. 7B), during the first mode period T1' of the sensing period SPn of the n-th first group, or by reducing the idle time between the driving signals TS1 and TS2.

Referring to the second one 1st Mode(2) of the first driving modes of FIG. 8B, each of the i sensing periods SPn−1, SPn, and SPn+1 of the first group may include the second mode period P1. The second input IP2 (e.g., see FIG. 1) may be monitored during each of the i sensing periods SPn−1, SPn, and SPn+1 of the first group. The sensor controller 200C (e.g., see FIG. 7A) may execute the operation in the first mode 1-M (e.g., see FIG. 7B) by the same iteration number, during each of the i sensing periods SPn−1, SPn, and SPn+1 of the first group.

Referring to the third one 1st Mode(3) of the first driving modes of FIG. 8B, the i sensing periods SPn−1, SPn, and SPn+1 of the first group may include front-end sensing periods and back-end sensing periods occurring in an alternating manner. Hereinafter, the sensing period SPn of the n-th first group will be referred to as the front-end sensing period, and the sensing period SPn+1 of the (n+1)-th first group will be referred to as the back-end sensing period. Also, the sensing period SPn−1 of the (n−1)-th first group will be referred to as the back-end sensing periods but the front-end sensing period corresponding to the sensing period SPn−1 of the (n−1)-th first group is not shown in the FIG. 8B. In the first driving mode (1st Mode(3)) according to some example embodiments, each of the i sensing periods SPn−1, SPn, and SPn+1 of the first group may also include the second mode period P1.

In the case where the second mode period P1 of the front-end sensing period SPn is positioned behind the first mode periods T1', the second mode period P1 of the back-end sensing periods SPn−1 and SPn+1 may be positioned in front of the first mode periods T1'. Thus, two second mode periods P1 of the front-end periods SPn and back-end sensing periods SPn+1, which are successively positioned, may be successively positioned. Accordingly, the second input IP2 (e.g., see FIG. 1) may be checked during two successive periods.

According to some example embodiments, the reverse case may be also possible. In the case where the second mode period P1 of the front-end sensing period SPn is positioned in front of the first mode periods T1', the second mode periods P1 of the back-end sensing periods SPn−1 and SPn+1 may be positioned behind the first mode periods T1'. In this case, the second mode period P1 of the sensing period SPn−1 of the (n−1)-th first group and the second mode period P1 of the front-end sensing period SPn of the n-th first group may be successively arranged.

Referring to the second driving mode 2nd Mode of FIG. 8B, each of k sensing periods SPn+1, SPn+2, and SPn+3 of the second group may include the first mode period T1". Although the first mode period T1" of each of the k sensing periods SPn+1, SPn+2, and SPn+3 is shown to be positioned behind the second mode periods P1', embodiments according to the inventive concept are not limited thereto. According to some example embodiments, in the case where, among the k sensing periods SPn+1, SPn+2, and SPn+3 of the second group, the first mode period T1" of the front-end sensing period SPn+2 is positioned behind the second mode periods P1', the first mode periods T1" of the back-end sensing periods SPn+1 and SPn+3 may be positioned in front of the second mode periods P1'. According to some example embodiments, in the case where the first mode period T1" of the front-end sensing period SPn+1 is positioned in front of the second mode periods P1', the first mode periods T1" of the back-end sensing periods SPn+1 and SPn+3 may be positioned behind the second mode periods P1'.

Referring to FIG. 8C, an operation of the second driving mode 2nd Mode may be different from that in the embodiment of FIG. 8A. According to some example embodiments, the k sensing periods SPn+1, SPn+2, and SPn+3 of the second group may not include the first mode period T1", during which the sensor controller 200C is operated in the first mode 1-M.

One of the k sensing periods SPn+1, SPn+2, and SPn+3 of the second group may be used as a mode transition period. FIG. 8C illustrates an example, in which the last period SPn+3 of the k sensing periods SPn+1, SPn+2, and SPn+3 of the second group is used as the mode transition period. If the second input IP2 is sensed during the second mode period P1, the second driving mode 2nd Mode may be maintained, as depicted by the reference numeral ④, but if the second input IP2 is not sensed during the second mode period P1, the driving mode may be changed to the first driving mode 1st Mode, as depicted by the reference numeral ⑤. If the second input IP2 is not sensed during one second mode period P1, the driving mode may be changed to the first driving mode 1st Mode, but embodiments according to the inventive concept are not limited to this example. For example, the driving mode may be set to be changed when the second input IP2 is not sensed during at least two successive second mode periods P1 or during the sensing period SPn+3 of one second group.

Figure 9:
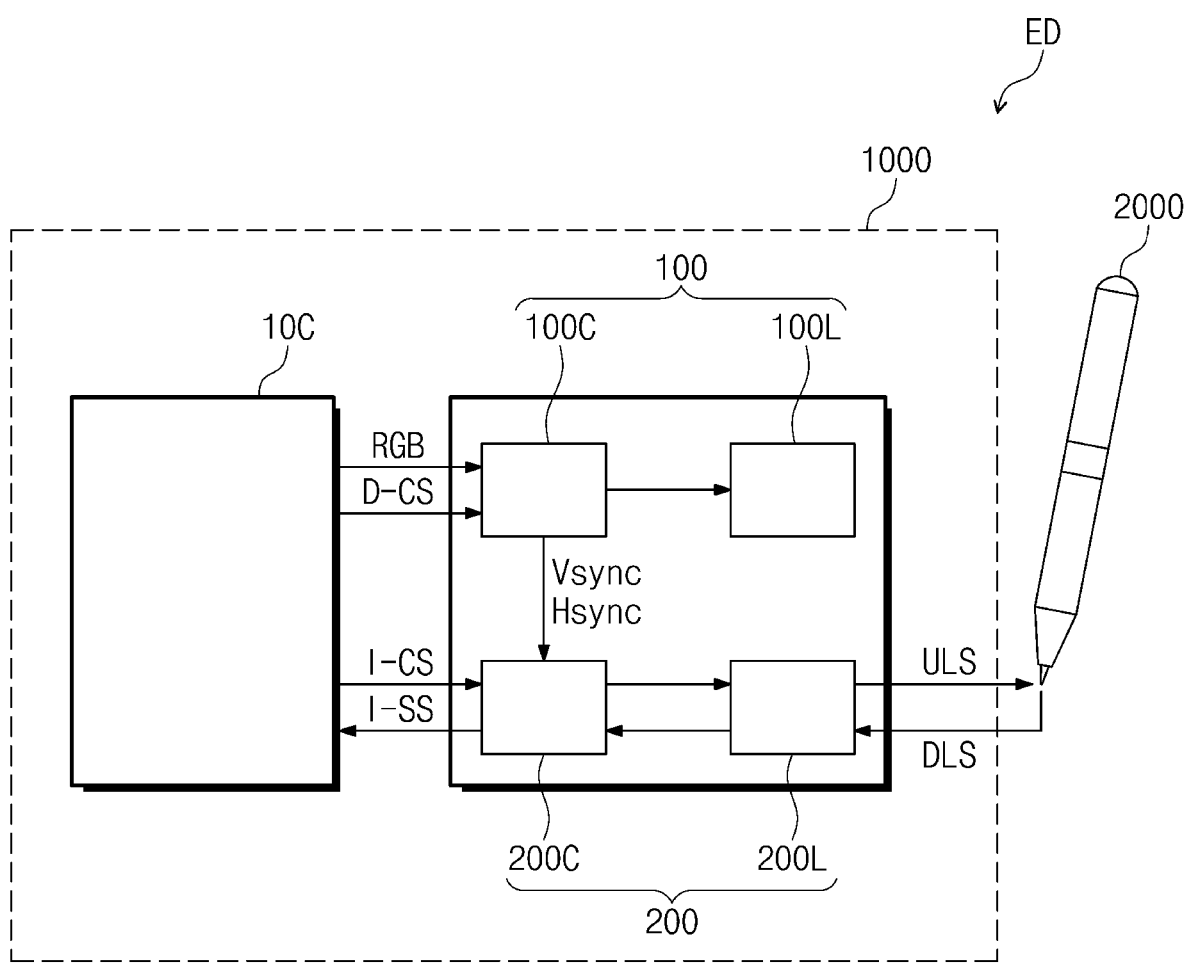
FIG. 9 is a block diagram illustrating an electronic device according to some example embodiments of the inventive concept.
Figure 10A:
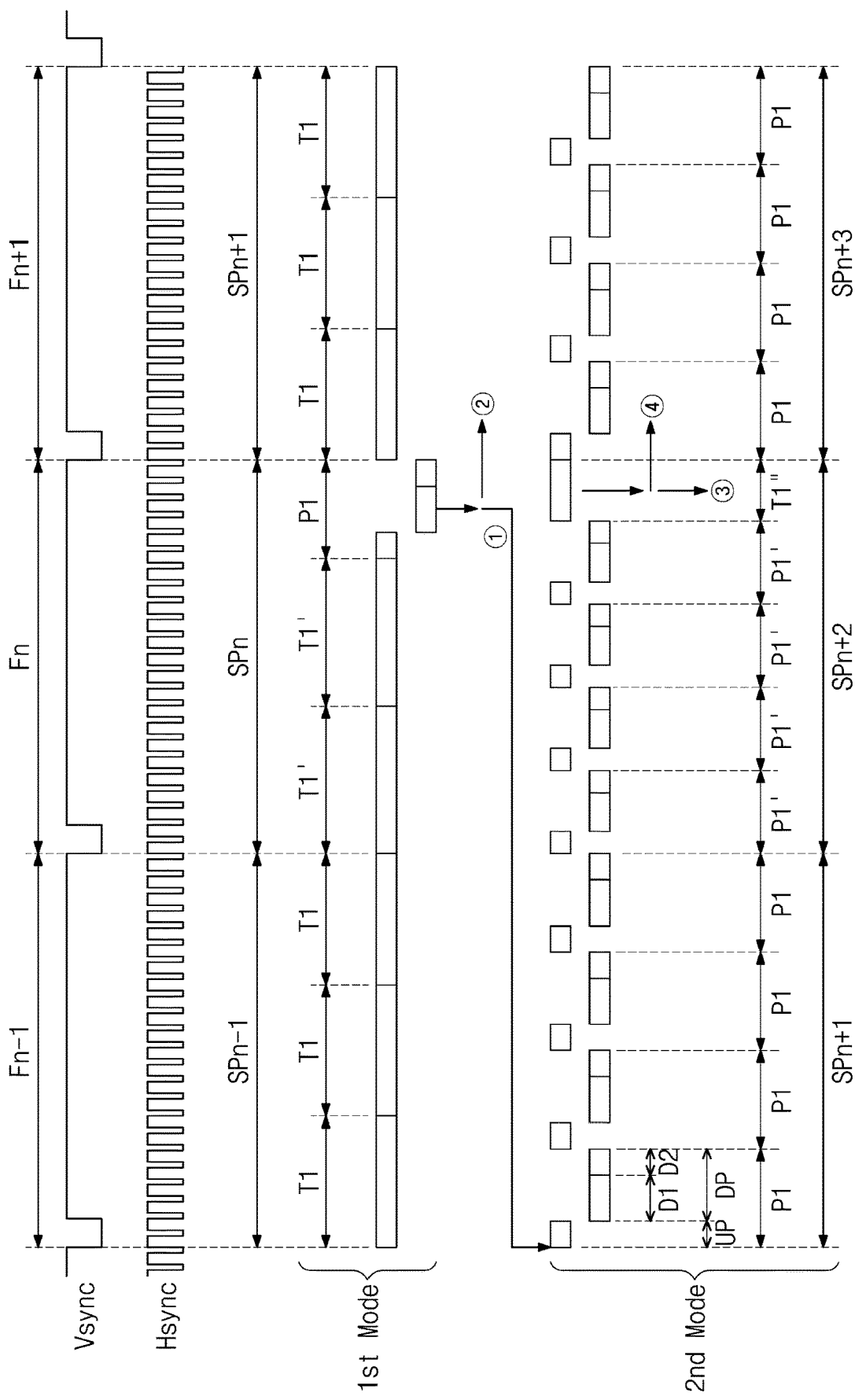
FIG. 10A is a conceptual diagram illustrating an operation of an input sensor according to some example embodiments of the inventive concept.
Figure 10B:
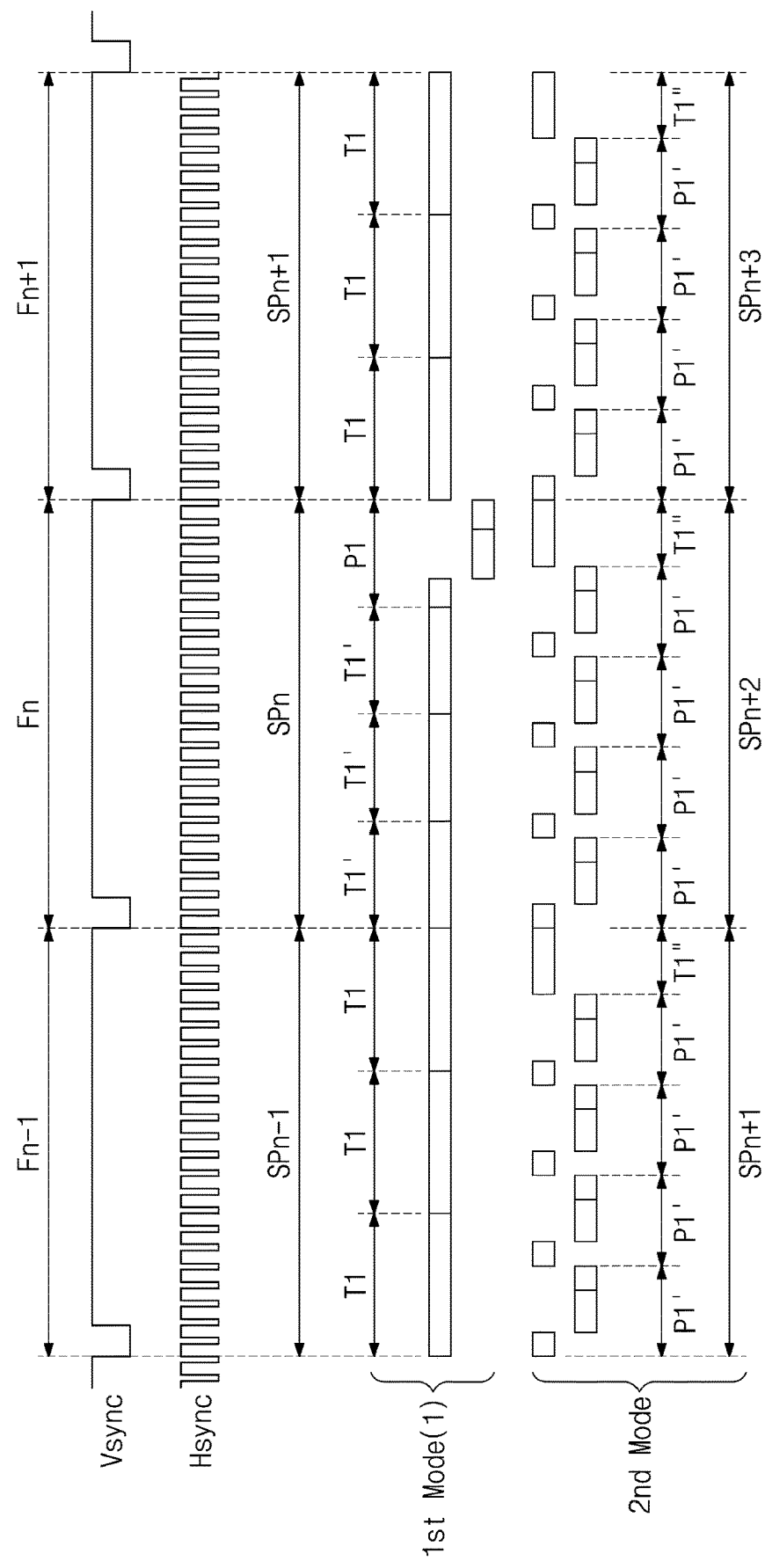
FIG. 10B is a conceptual diagram illustrating an operation of an input sensor according to some example embodiments of the inventive concept.
Figure 10C:
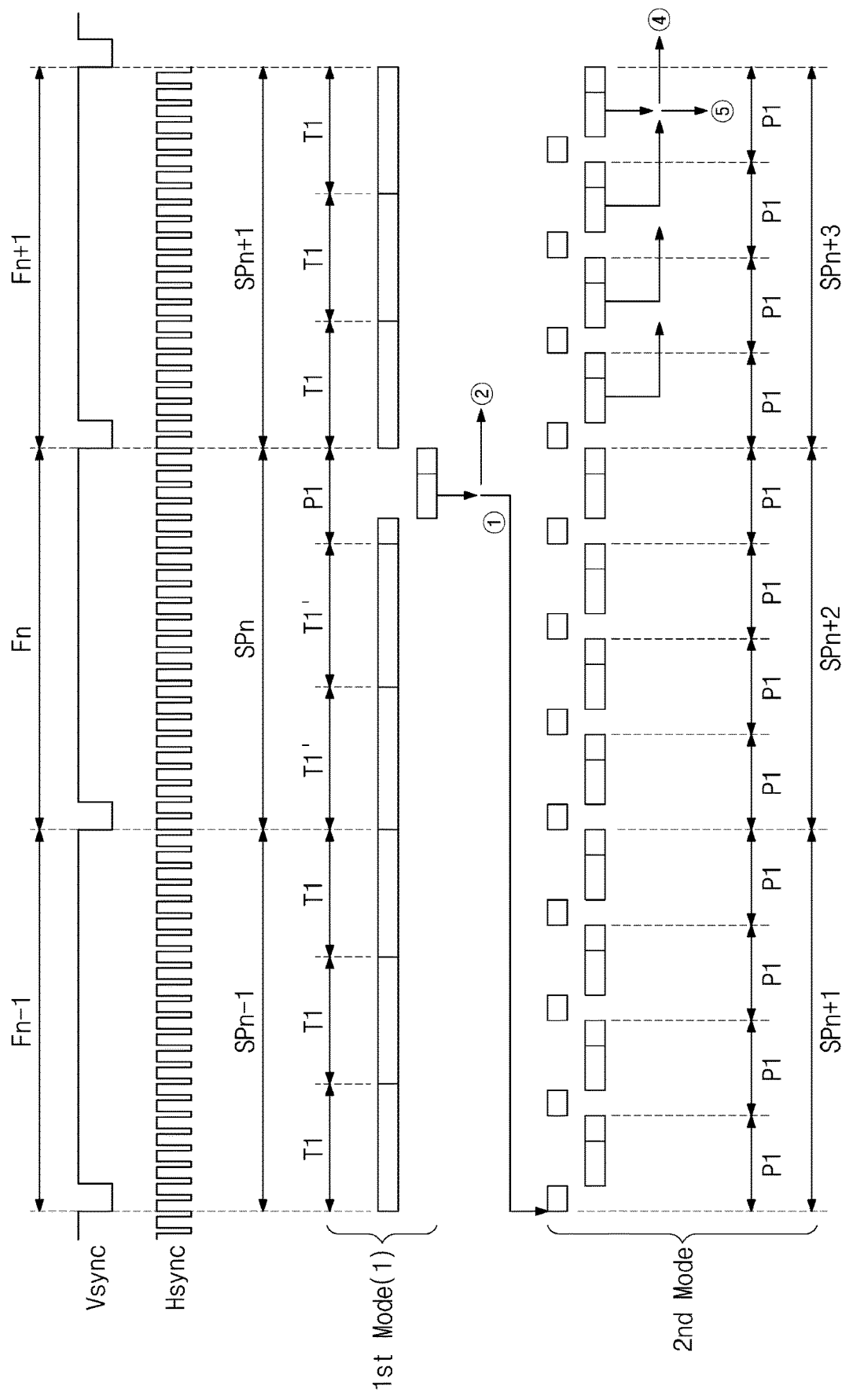
FIG. 10C is a conceptual diagram illustrating an operation of an input sensor according to some example embodiments of the inventive concept.

FIG. 9 is a block diagram illustrating the electronic device ED according to some example embodiments of the inventive concept. FIG. 10A is a conceptual diagram illustrating an operation of the input sensor 200 according to some example embodiments of the inventive concept. FIG. 10B is a conceptual diagram illustrating an operation of the input sensor 200 according to some example embodiments of the inventive concept. FIG. 10C is a conceptual diagram illustrating an operation of the input sensor 200 according to some example embodiments of the inventive concept. For concise description, an element previously described with reference to FIGS. 1 to 8C will be identified by the same reference number without repeating an overlapping description thereof.

Referring to FIGS. 6, 9, and 10A, the display layer 100L may display a frame image every frame period Fn−1, Fn, and Fn+1. The frame periods Fn−1, Fn, and Fn+1 may be a time taken to scan the scan lines SL1-SLn one time and may be defined as a time interval from a falling edge of the vertical synchronization signal Vsync to a next falling edge. According to some example embodiments, the frame periods Fn−1, Fn, and Fn+1 may be defined as a time interval from a rising edge of the vertical synchronization signal Vsync to a next rising edge.

The scan driving circuit 100C2 may provide scan signals to the scan lines SL1-SLn, respectively, during each of the frame periods Fn−1, Fn, and Fn+1, in synchronization with the vertical synchronization signal Vsync. In the case where an operation frequency of the display layer 100L is 60 Hz, a time interval corresponding to one frame may be about 16.66 ms, and in the case where the operation frequency of the display layer 100L is 120 Hz, the time interval corresponding to one frame may be about 8.33 ms.

The display controller 100C may provide the vertical synchronization signal Vsync and the horizontal synchronization signal Hsync to the sensor controller 200C. The sensor controller 200C may be operated in the first driving mode 1st Mode or the second driving mode 2nd Mode, based on the vertical synchronization signal Vsync and the horizontal synchronization signal Hsync.

The sensor controller 200C may set the sensing periods SPn−1, SPn, SPn+1, SPn+2, and SPn+3, based on the vertical synchronization signal Vsync and the horizontal synchronization signal Hsync. In other words, the sensing periods SPn−1, SPn, SPn+1, SPn+2, and SPn+3 may be synchronized with the frame periods Fn−1, Fn, and Fn+1.

In more detail, starting time points of the sensing periods SPn−1, SPn, SPn+1, SPn+2, and SPn+3 may be determined from a time point, at which a level of the vertical synchronization signal Vsync is changed. For example, the starting time point of the (n−1)-th sensing period SPn−1 may be corresponded to at the falling edge of the vertical synchronization signal Vsync. According to some example embodiments, the starting time point of each of the sensing periods SPn−1, SPn, SPn+1, SPn+2, and SPn+3 may be started at a time point when a specific time elapses from a time point, at which a level of the vertical synchronization signal Vsync is changed. Here, the specific time may be synchronized with a time that is given by counting the horizontal synchronization signal Hsync from the time point, at which the level of the vertical synchronization signal Vsync is changed, X times.

When the input sensor 200 is operated in the second driving mode 2nd Mode, the sensor controller 200C may provide existing information on the operation of the down-link period DP, to the second input device 2000, during the up-link period UP. For example, the up-link signal ULS may include information on starting and ending time points of the down-link period DP. The up-link signal ULS may include information on starting and ending time points of each of the first and second periods D1 and D2. The up-link signal ULS may include information on a frequency of the vertical synchronization signal Vsync and a frequency of the horizontal synchronization signal Hsync.

Referring to FIG. 10A, the sensor controller 200C may control a length of the first mode period T1' of the n-th sensing period SPn, based on the vertical synchronization signal Vsync and the horizontal synchronization signal Hsync. Because, unlike other sensing periods SPn−1 and SPn+1, the n-th sensing period SPn includes the second mode period P1, the length of the first mode period T1' may have a different value from that of other sensing periods SPn−1 and SPn+1. Here, the first mode period T1' may be increased, or an idle time may be added before the second mode period P1. In addition, the sensor controller 200C may control a length of the second mode period P1' of the (n+2)-th sensing period SPn+2, based on the vertical synchronization signal Vsync and the horizontal synchronization signal Hsync.

A noise signal, which is provided from the display layer 100L (e.g., see FIG. 4B) to the sensor layer 200L, may be relatively increased a period when the level of the horizontal synchronization signal Hsync is changed. The sensor controller 200C may intermittently sense the down-link signal DLS, during a period when the horizontal synchronization signal Hsync is maintained to a high or low level, and in this case, it may be possible to prevent or reduce instances of the down-link signal DLS being sensed during the period when the level of the horizontal synchronization signal Hsync is changed. The down-link signal DLS (e.g., see FIG. 9) may be received from a region, at which a signal-to-noise ratio (SNR) is high, and in this case, improve the sensing sensitivity of the electronic device ED.

According to some example embodiments, the second input device 2000 may provide a driving signal of a modulated second mode. By using the frequency information of the horizontal synchronization signal Hsync obtained from the up-link signal, a pulsed driving signal may be provided, during only the period when the horizontal synchronization signal Hsync is maintained to a high or low level.

FIG. 10B illustrates an operation of the input sensor 200 corresponding to FIG. 8B. However, one of the three first driving modes 1st Mode(1), 1st Mode(2), and 1st Mode(3) is illustrated in FIG. 10B, unlike that in FIG. 8B. Each of the three first driving modes 1st Mode(1), 1st Mode(2), and 1st Mode(3) and the second driving mode 2nd Mode of FIG. 10B may be controlled, based on the vertical synchronization signal Vsync and the horizontal synchronization signal Hsync.

FIG. 10C illustrates an operation of the input sensor 200 corresponding to FIG. 8C. Each of the first driving mode 1st Mode and the second driving mode 2nd Mode may be controlled, based on the vertical synchronization signal Vsync and the horizontal synchronization signal Hsync.

According to some example embodiments of the inventive concept, by determining which of several input device is mainly used, it may be possible to improve the sensing sensitivity and reduce an unnecessary operation. A driving mode of an input sensor may be changed by determining whether an input device in use is changed. Thus, the input sensor can execute a real-time operation in a driving mode optimized for the input device. Accordingly, the sensing sensitivity of the input sensor may be improved.

Because a display panel is operated in synchronization with the input sensor, according to some example embodiments, it may be possible to suppress a noise issue, which is caused by the display panel, during an operation of the input sensor. An external input may be sensed during a period when a noise issue by the display panel is reduced.

While example embodiments of the inventive concept have been particularly shown and described, it will be understood by one of ordinary skill in the art that variations in form and detail may be made therein without departing from the spirit and scope of the attached claims and their equivalents.

What is claimed is:

1. A display device, comprising:
   a display panel configured to generate an image; and
   an input sensor configured to operate in a first driving mode or a second driving mode,
   wherein the input sensor comprises:
      a sensor layer including a first electrode and a second electrode crossing each other; and a sensor controller configured to operate in a first mode, in which the first electrode and the second electrode are operated as different groups, or in a second mode, in which the first electrode and the second electrode are operated as a same group by being commonly operated as reception electrodes for receiving a down-link signal from an input device, or by being commonly operated as transmission electrodes for transmitting an up-link signal to the input device, wherein the sensor controller is configured to operate the first electrode and the second electrode in the first mode during at least a first period of each of the first driving mode and the second driving mode, wherein the sensor controller is configured to operate the first electrode and the second electrode in the second mode during at least a second period of each of the first driving mode and the second driving mode, and wherein the input sensor is configured to change from the first driving mode to the second driving mode when the input sensor senses a touch input of the input device or a hovering event of the input device in the second mode of the first driving mode.

2. The display device of claim 1, wherein each of successive sensing periods of a first group comprises a plurality of first mode periods in which the sensor controller is operated in the first mode.

3. The display device of claim 2, wherein, during the successive sensing periods of the first group, an operation of the input sensor is repeated by units of i sensing periods, where i is a natural number that is equal to or greater than 2, and wherein at least one sensing period of the i sensing periods comprises a second mode period, in which the sensor controller is operated in the second mode.

4. The display device of claim 3, wherein each of remaining sensing periods of the i sensing periods comprise the first mode periods, a number of which is m that is a natural number equal to or greater than 2, the at least one sensing period comprises the first mode periods, a number of which is m, and one of the first mode periods of the at least one sensing period is shorter than one of the first mode periods of each of the remaining sensing periods.

5. The display device of claim 3, wherein each of the i sensing periods comprises the second mode period.

6. The display device of claim 5, wherein the i sensing periods comprise front-end sensing periods and back-end sensing periods occurring in an alternating manner, one of the second mode periods of each of the back-end sensing periods is positioned in front of the plurality of first mode periods of each of the front-end sensing periods, in response to one of the second mode periods of each of the front-end sensing periods being positioned behind the plurality of first mode periods of each of the front-end sensing periods, and the one of the second mode periods of each of the back-end sensing periods is positioned behind the plurality of first mode periods of each of the front-end sensing periods, in response to the one of the second mode periods of each of the front-end sensing periods being positioned in front of the plurality of first mode periods of each of the front-end sensing periods.

7. The display device of claim 2, wherein, during each of the plurality of first mode periods, the sensor controller is configured to provide a driving signal of the first mode to one of the first and second electrodes and to receive a sensing signal from the other of the first and second electrodes.

8. The display device of claim 1, wherein each of successive sensing periods of a second group comprises a plurality of second mode periods, in which the sensor controller is operated in the second mode.

9. The display device of claim 8, wherein each of the plurality of second mode periods comprises:

an up-link period, in which the first and second electrodes receive the up-link signal from the sensor controller; and a down-link period, in which the first and second electrodes receive the down-link signal from the input device.

10. The display device of claim 9, wherein the down-link signal comprises a driving signal of the second mode indicating the touch input of the input device and a modulation signal indicating information of the input device, and the down-link period comprises a first period, in which the first and second electrodes receive the driving signal of the second mode, and a second period, in which the first and second electrodes receive the modulation signal.

11. The display device of claim 8, wherein each of the successive sensing periods of the second group further comprises a first mode period, in which the sensor controller is operated in the first mode.

12. The display device of claim 8, wherein the input sensor is configured to change from the second driving mode to the first driving mode, when the input sensor does not sense the touch input of the input device during a specific period of the successive sensing periods of the second group.

13. The display device of claim 1, wherein the display panel comprises:

a display layer including a plurality of scan lines, a plurality of data lines, and a plurality of pixels connected to the plurality of scan lines and the plurality of data lines;

a scan driving circuit connected to the plurality of scan lines; and a data driving circuit connected to the plurality of data lines, wherein the scan driving circuit is configured to provide scan signals to the plurality of scan lines, respectively, during each of a plurality of frame periods, in synchronization with vertical synchronization signal.

14. The display device of claim 13, wherein each of successive sensing periods of a first group is synchronized with a corresponding one of the plurality of frame periods, and each of successive sensing periods of a second group is synchronized with a corresponding one of the plurality of frame periods.

15. A display device, comprising:

a display panel configured to generate an image; and an input sensor configured to operate in a first driving mode or a second driving mode, wherein the input sensor comprises:

a sensor layer including a first electrode and a second electrode crossing each other; and a sensor controller configured to operate in a first mode, in which the first electrode and the second electrode are operated as different groups, or in a second mode, in which the first electrode and the second electrode are operated as a same group, wherein the sensor controller is configured to have an operation time of the first mode, which is longer than an operation time of the second mode, in response to the input sensor operating in the first driving mode during successive sensing periods of a first group, wherein the sensor controller is configured to have the operation time of the second mode, which is longer than the operation time of the first mode, in response to the input sensor operating in the second driving mode during successive sensing periods of a second group, wherein each of the successive sensing periods of the first group comprises a plurality of first mode periods, in which the sensor controller is operated in the first mode, wherein, during the successive sensing periods of the first group, an operation of the input sensor is repeated by units of i sensing periods, where i is a natural number that is equal to or larger than 2, wherein at least one sensing period of the i sensing periods comprises a second mode period, in which the sensor controller is operated in the second mode, wherein each of remaining sensing periods of the i sensing periods comprise the first mode periods, a number of which is m that is a natural number equal to or greater than 2, and wherein the at least one sensing period further comprises the first mode periods, a number of which is less than m.

16. The display device of claim 15, wherein one of the first mode periods of the at least one sensing period is longer than one of the first mode periods of each of the remaining sensing periods.

17. A display device, comprising:

a display panel configured to generate an image; and an input sensor configured to operate in a first driving mode or a second driving mode, wherein the input sensor comprises:

a sensor layer including a first electrode and a second electrode crossing each other; and a sensor controller configured to operate in a first mode, in which the first electrode and the second electrode are operated as different groups, or in a second mode, in which the first electrode and the second electrode are operated as a same group, wherein the sensor controller is configured to have an operation time of the first mode, which is longer than an operation time of the second mode, in response to the input sensor operating in the first driving mode during successive sensing periods of a first group, wherein the sensor controller is configured to have the operation time of the second mode, which is longer than the operation time of the first mode, in response to the input sensor operating in the second driving mode during successive sensing periods of a second group, wherein each of the successive sensing periods of the second group comprises a plurality of second mode periods, in which the sensor controller is operated in the second mode, wherein, during the successive sensing periods of the second group, an operation of the input sensor is repeated by units of k sensing periods, where k is a natural number that is equal to or greater than 2, at least one sensing period of the k sensing periods comprises a first mode period, in which the sensor controller is operated in the first mode, remaining sensing periods of the k sensing periods comprise the second mode periods, a number of which is p that is a natural number equal to or greater than 2, the at least one sensing period comprise the second mode periods, a number of which is p, and one of the second mode periods of the at least one sensing period is shorter than the one of second mode periods of the remaining sensing periods.

18. The display device of claim 17, wherein the input sensor is configured to change from the second driving mode to the first driving mode, when the input sensor senses an input of a user during the first mode period.

* * * * *